(12) United States Patent  
Sengupta et al.

(10) Patent No.: US 12,178,221 B2
(45) Date of Patent: Dec. 31, 2024

(54) CHEWING GUM COMPOSITIONS AND METHODS OF MAKING THEREOF

(71) Applicant: PERFETTI VAN MELLE BENELUX BV, HK Breda (NL)

(72) Inventors: Tapashi Sengupta, East Hanover, NJ (US); Suraksha Rajagopal, East Hanover, NJ (US); Simman Wong, East Hanover, NJ (US); Bhairavi Modak, East Hanover, NJ (US); Bharat Jani, East Hanover, NJ (US); William Hirt, East Hanover, NJ (US); Hanqing Yang, East Hanover, NJ (US); Helen Terrezza, East Hanover, NJ (US)

(73) Assignee: PERFETTI VAN MELLE BENELUX BV, HK Breda (NL)

( * ) Notice: Subject to any disclaimer, the term of this patent is extended or adjusted under 35 U.S.C. 154(b) by 637 days.

(21) Appl. No.: 16/617,111

(22) PCT Filed: Jun. 4, 2018

(86) PCT No.: PCT/US2018/035826
§ 371 (c)(1),
(2) Date: Nov. 26, 2019

(87) PCT Pub. No.: WO2018/226570
PCT Pub. Date: Dec. 13, 2018

(65) Prior Publication Data
US 2020/0178558 A1    Jun. 11, 2020

Related U.S. Application Data

(60) Provisional application No. 62/546,698, filed on Aug. 17, 2017, provisional application No. 62/515,255, filed on Jun. 5, 2017.

(51) Int. Cl.
*A23G 4/06* (2006.01)
*A23G 4/02* (2006.01)
(Continued)

(52) U.S. Cl.
CPC .............. *A23G 4/066* (2013.01); *A23G 4/025* (2013.01); *A23G 4/04* (2013.01); *A23G 4/068* (2013.01);
(Continued)

(58) Field of Classification Search
CPC .......... A23G 4/066; A23G 4/025; A23G 4/04; A23G 4/068; A23G 4/08; A23G 4/18;
(Continued)

(56) References Cited

U.S. PATENT DOCUMENTS 4,032,661 A   6/1977  Rowsell et al.
4,136,163 A   1/1979  Watson et al.
(Continued)

FOREIGN PATENT DOCUMENTS

EP    0421670 A2   9/1990
WO    9532635      12/1995
(Continued)

OTHER PUBLICATIONS

Tan. Chapter 1: Physical Chemistry in Flavor Products Preparation, Flavor Technology, Ho et al. ACS. pp. 9-11. (Year: 1995).*
(Continued)

*Primary Examiner* — Jenna A Watts
(74) *Attorney, Agent, or Firm* — Silvia Salvadori, P.C.; Silvia Salvadori

(57) ABSTRACT

Disclosed herein are chewing gum compositions having fat polymorphs that are predominantly beta prime and/or beta over alpha. Also disclosed are methods of forming chewing gum compositions having predominantly beta prime and/or beta fat polymorphs which have sufficient textural properties
(Continued)

to be processed into wrapped/packaged chewing gum products or coated to coated chewing gum products. Improved methods of forming and conditioning chewing gum to reduce costs, cut down on conditioning time, and to improve gum sensory properties are disclosed.

17 Claims, 10 Drawing Sheets

(51) Int. Cl.
    *A23G 4/04*     (2006.01)
    *A23G 4/08*     (2006.01)
    *A23L 27/00*     (2016.01)
    *A23L 27/30*     (2016.01)

(52) U.S. Cl.
    CPC ............... *A23G 4/08* (2013.01); *A23L 27/34* (2016.08); *A23L 27/88* (2016.08); *A23V 2002/00* (2013.01)

(58) Field of Classification Search
    CPC ........... A23G 3/34; A23G 4/006; A23L 27/34; A23L 27/88
    See application file for complete search history.

(56) References Cited

U.S. PATENT DOCUMENTS

| | | | |
|---|---|---|---|
| 4,178,459 A | 12/1979 | Watson et al. | |
| 4,230,688 A | 10/1980 | Rowsell et al. | |
| 4,296,255 A | 10/1981 | Roswell et al. | |
| 4,459,425 A | 7/1984 | Amano et al. | |
| 5,009,893 A | 4/1991 | Cherukuri et al. | |
| 5,266,592 A | 11/1993 | Grub et al. | |
| 5,407,665 A | 4/1995 | McLaughlin et al. | |
| 5,417,988 A | 5/1995 | Burger et al. | |
| 5,436,013 A * | 7/1995 | Synosky | A23G 4/10 426/5 |
| 5,545,424 A | 8/1996 | Nakatsu et al. | |
| 5,562,936 A | 10/1996 | Song et al. | |
| 5,679,397 A | 10/1997 | Kuroda et al. | |
| 5,698,181 A | 12/1997 | Luo | |
| 6,030,646 A * | 2/2000 | Cain | A23G 4/00 426/6 |
| 6,159,509 A | 12/2000 | Johnson et al. | |
| 6,254,373 B1 | 7/2001 | Hoffman et al. | |
| 6,277,385 B1 | 8/2001 | Luke | |
| 6,627,233 B1 | 9/2003 | Wolf et al. | |
| 6,780,443 B1 | 8/2004 | Nakatsu et al. | |
| 7,030,273 B1 | 4/2006 | Sun | |
| 8,226,401 B2 | 7/2012 | Olejarski et al. | |
| 2004/0170720 A1 | 9/2004 | Yatka et al. | |
| 2005/0222256 A1 | 10/2005 | Erman et al. | |
| 2005/0265930 A1 | 12/2005 | Erman et al. | |
| 2015/0223488 A1* | 8/2015 | Kabse | A23G 4/10 426/3 |
| 2017/0135367 A1 | 5/2017 | Aydin | |

FOREIGN PATENT DOCUMENTS

| | | |
|---|---|---|
| WO | 9748286 | 12/1997 |
| WO | 2006125334 A1 | 11/2006 |
| WO | 2013013046 A2 | 1/2013 |
| WO | 2013158291 A2 | 10/2013 |

OTHER PUBLICATIONS

Euston, Chapter 7: Emulsifiers in Dairy Products and Dairy Substitutes, in Food Emulsifiers and their Application, Hasenheuttl, ed, Springer, p. 203. (Year: 2008).*
International Search Report for International Application No. PCT/US2018/035826, International Filing Date Jun. 4, 2018, Date of Mailing Sep. 17, 2018, 6 pages.
Written Opninion for International Application No. PCT/US2018/035826, International Filing Date Jun. 4, 2018, Date of Mailing Sep. 17, 2018, 7 pages.

* cited by examiner

CHEWING GUM COMPOSITIONS AND METHODS OF MAKING THEREOF

CROSS-REFERENCE TO RELATED APPLICATIONS

This Application is a U.S. National Stage Application of PCT/US2018/035826, filed Jun. 4, 2018, which claims the benefit of U.S. Provisional Patent Application No. 62/546,698, filed Aug. 17, 2017, and U.S. Provisional Patent Application No. 62/515,255, filed Jun. 5, 2017, each of which is incorporated by reference in its entirety.

BACKGROUND

Traditionally, chewing gum compositions used to make slab and pellet chewing gum products are prepared in conventional batch and continuous systems according to a general procedure where gum base and other chewing gum ingredients are mixed in a batch mixer or in an extruder in a continuous process to form a chewing gum mixture, the mixture is then rolled and scored with the aid of a dusting agent (e.g. mannitol, talc or mix of the two), and then the chewing gum mass is conditioned for 24 to 72 hours at around 13° C. and 24% relative humidity (RH) to harden the chewing gum mass to prepare slab gums for efficient packaging in high speed packaging machines or to harden the chewing gum mass to prepare pellet cores for coating in pan coaters.

There is a specified minimum hardness requirement for each of slab and pellet chewing gums for efficient wrapping/packaging and coating. The minimum hardness for slab chewing gum is around 120 kilopascal (kPa) Young's modulus (Ym) measured at 20° C. The minimum hardness required for pellet cores to be coated is around 45 Durometer Shore A hardness.

Besides conditioning processes, the chewing gum hardness can be affected by the type and amount of ingredients used to make the chewing gum composition. Although fats and waxes are used in chewing gum routinely, it has not been previously known what role fats and waxes play in chewing gum hardness, particularly during conditioning. There remains a need in the art for improved chewing gum compositions and improved methods of forming and conditioning chewing gum to reduce costs, cut down on conditioning time, and to improve gum sensory properties.

SUMMARY

In an embodiment, a chewing gum composition comprises about 2 to about 15 wt % fat based on the total weight of the chewing gum composition; wherein the fat in the chewing gum composition comprises i) beta prime fat polymorph and/or beta fat polymorph and ii) alpha fat polymorph, with a ratio of beta prime fat polymorph and/or beta fat polymorph to alpha fat polymorph that is predominantly beta prime fat polymorph and/or beta fat polymorphs.

In another embodiment, a method of forming chewing gum comprises forming an initial chewing gum mass comprising a gum base, a bulk sweetener, and about 2 to about 15 wt % of a fat based on the total weight of the chewing gum composition, wherein the fat in the initial chewing gum mass has a ratio of beta prime fat polymorph and/or beta fat polymorph to alpha fat polymorph that is predominantly alpha fat polymorph; heating the initial chewing gum mass to an elevated temperature of about 35 to about 60° C. (specifically about 40 to about 55° C.; or about 45 to about 50° C.); maintaining the initial chewing gum mass at the elevated temperature for about 20 minutes to about 6 hours (specifically about 30 minutes to about 5 hours; or about 45 minutes to about 3 hours); and cooling and conditioning the initial chewing gum mass to result in a conditioned chewing gum mass wherein the fat has a ratio of beta prime fat polymorph and/or beta fat polymorph to alpha fat polymorph that is predominantly beta prime fat polymorph and/or beta fat polymorph.

In another embodiment, a method of manufacturing a confection, comprises providing a confectionery mass; holding the confectionery mass at a temperature between about 25° C. and about 75° C. and at a relative humidity of less than 80% for a predetermined time; and cooling the confectionery mass downstream of the holding.

In another embodiment, a method of manufacturing a confection comprises mixing a plurality of ingredients to form a confectionery mass in a mixing station; forming the confectionery mass into a substantially continuous confectionery sheet having a substantially uniform thickness via a forming station; and increasing a hardness of the confectionery mass or the confectionery sheet without cooling the confectionery mass or the confectionery sheet to below room temperature.

In an embodiment, a system for the continuous manufacturing and packaging of chewing gum comprises a continuous extruder for mixing chewing gum ingredients; a treatment station for maintaining the chewing gum at an elevated temperature for a predetermined time; a forming station; a cooling tunnel; and a packaging system, operated in such a manner that there is a continuous flow of chewing gum material from mixing through packaging.

The above described and other features are exemplified by the following detailed description.

BRIEF DESCRIPTION OF THE DRAWINGS

The accompanying drawings incorporated in and forming a part of the specification.

DETAILED DESCRIPTION

Figure 1:
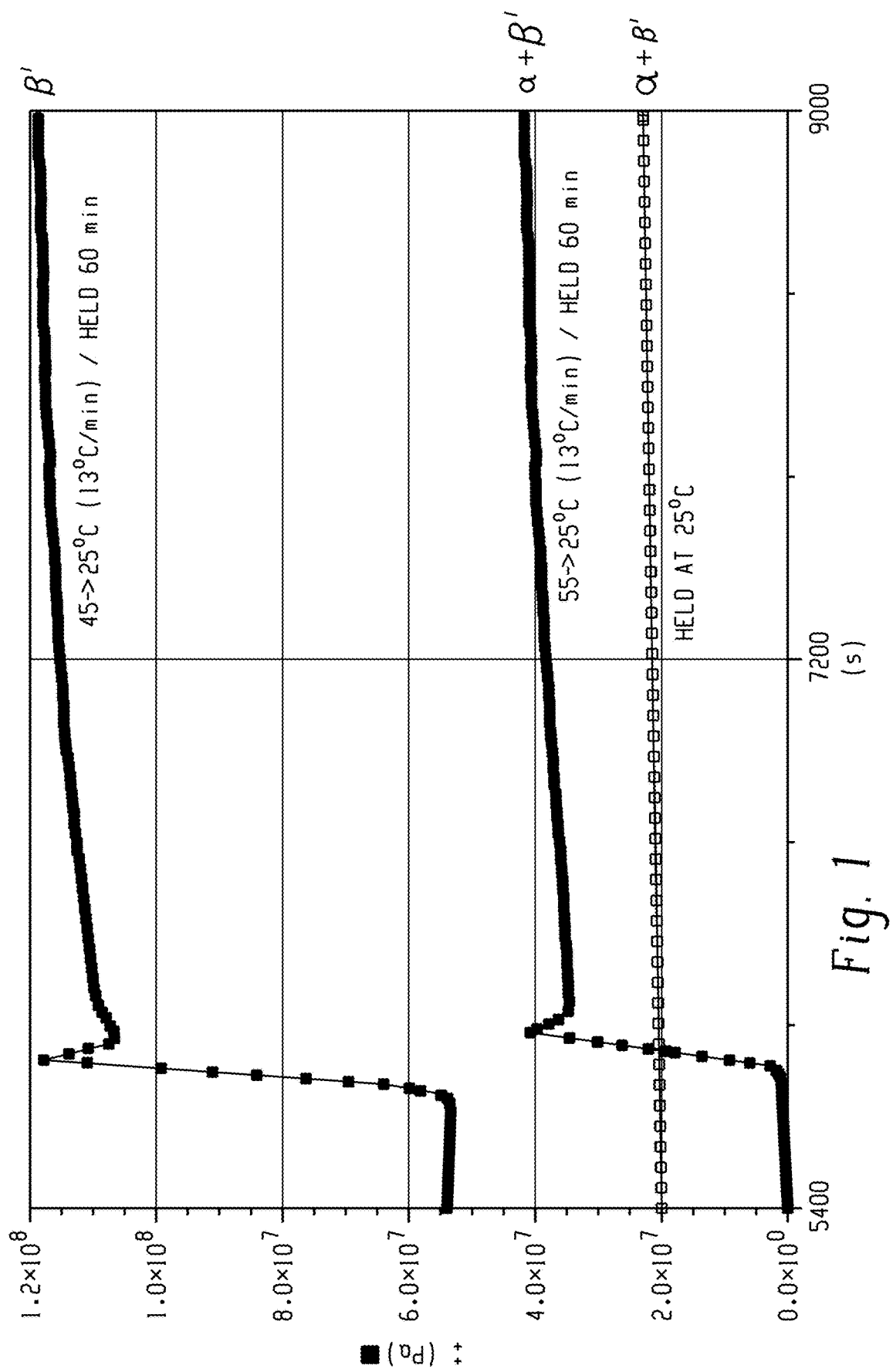
FIG. 1 illustrates the rheology results of a hydrogenated cottonseed gum base comparing three different heat/hold cycles at 25° C.

Disclosed herein are chewing gum compositions comprising crystalline lipids, and more specifically comprising crystalline fats and optionally waxes.

It has been determined that chewing gum compositions having a particular ratio of fat polymorphs achieve the required hardness needed for packaging, coating, or processing while maintaining desirable sensorial characteristics. Fat, specifically triglycerides, generally crystallize into three distinct structures referred to as polymorphs: a (alpha), β' (beta prime), and β (beta). The beta polymorph is the most thermodynamically stable, followed by the beta prime polymorph and then the alpha polymorph. However, the activation energy to go from liquid fat to the alpha polymorph is the lowest, followed by beta prime and then beta. Thus, alpha polymorph forms quickly at low temperatures while beta prime and beta form only at higher temperatures when the fat has enough energy to cross the higher activation barrier.

All three fat polymorphs can form directly from the melt; alpha can transform into both beta and beta prime but beta and beta prime cannot turn back into alpha without melting first. The more stable polymorphs of fat are smaller in size, pack more compactly, and thereby increase the hardness in fats. In turn, a gum base or chewing gum composition comprising fat will exhibit increasing hardness as the ratio of beta prime and beta fat polymorphs to alpha fat polymorph increases.

In an embodiment, a chewing gum composition comprises a fat having a ratio of beta prime and/or beta polymorphs to alpha polymorph that is predominantly beta prime and/or beta polymorphs. Furthermore, the ratio can be determined within about 60 days, specifically within about 45 days, more specifically within about 30 days, yet specifically within about 15 days from manufacturing the chewing gum composition. As used herein the term "beta prime and/or beta" means "beta prime, beta, or a combination of beta prime and beta".

In an embodiment, a chewing gum composition comprises a fat having a ratio of beta prime and/or beta polymorphs to alpha polymorph that is predominantly beta prime and/or beta polymorphs when the ratio is determined at a time between the completion of conditioning the chewing gum and the time of packaging, wrapping, or coating the chewing gum composition. In another embodiment, the ratio is determined prior to packaging, wrapping, or coating the chewing gum composition.

The chewing gum composition can contain a fat having a ratio of beta prime and/or beta polymorphs to alpha polymorph that is predominantly beta prime and/or beta polymorphs, specifically wherein the fat comprises about 50 to about 100% beta prime and/or beta polymorphs and the remainder alpha polymorph, more specifically about 55 to about 95% beta prime and/or beta polymorphs and the remainder alpha polymorph, yet more specifically about 60 to about 90% beta prime and/or beta polymorphs and the remainder alpha polymorph, still yet more specifically about 65 to about 85% beta prime and/or beta polymorphs and the remainder alpha polymorph, more specifically about 70 to about 80% beta prime and/or beta polymorphs and the remainder alpha polymorph, and yet more specifically about 55 to about 85% beta prime and/or beta polymorphs and the remainder alpha polymorph.

The ratio of beta and/or beta prime fat polymorph to alpha fat polymorph in the chewing gum compositions or gum base described herein can be determined using several analytical methods including differential scanning calorimetry, X-ray diffraction analysis, Raman spectroscopy, or a combination thereof.

The fat that can be used in the chewing gum composition can be those described in more detail below and can be a component of a chewing gum base, a separate chewing gum ingredient added separate from the gum base, or as part of both the gum base and added as a separate chewing gum ingredient in addition to the gum base. In an embodiment, the fat is a hydrogenated vegetable oil, hydrogenated cottonseed oil, hydrogenated palm kernel oil, hydrogenated soybean oil, hydrogenated sunflower seed oil, hydrogenated peanut oil, hydrogenated coconut oil, hydrogenated sesame oil, or a combination thereof.

In an embodiment, the fat is a mixed triglyceride comprising greater than or equal to 50% C18 saturated fatty acid, specifically greater than or equal to 60% C18 saturated fatty acid, more specifically greater than or equal to 70% C18 saturated fatty acid, yet more specifically greater than or equal to 80% C18 saturated fatty acid, and still more specifically greater than or equal to 90% C18 saturated fatty acid. Further within this embodiment, the fat is a mixed triglyceride comprising less than 50% C16 saturated, specifically less than or equal to 40% C16 saturated fatty acid, more specifically less than or equal to 30% C16 saturated fatty acid, still more specifically less than or equal to 20% C16 saturated fatty acid, and yet more specifically less than or equal to 10% C16 saturated fatty acid.

In a further embodiment, the fat is a mixed triglyceride having predominantly C18 saturated fatty acid and greater than or equal to 25% tristearin, specifically greater than or equal to 30% tristearin, more specifically greater than or equal to 35% tristearin, yet more specifically greater than or equal to 40% tristearin, and still yet more specifically greater than or equal to 45% tristearin, and more specifically greater than or equal to 50% tristearin. Further within this embodiment, the fat comprises less than or equal to 40% tripalmitin, specifically less than or equal to 30% tripalmitin, yet more specifically less than or equal to 20% tripalmitin, still yet more specifically less than or equal to 10% tripalmitin, and still yet more specifically less than or equal to 3% tripalmitin.

Fats having the defined amounts of C18 fatty acid triglyceride content, low C16 fatty acid triglyceride content, tristearin content and low tripalmitin content can be prepared by modifying naturally or commercially available fats by fractionating, blending, transesterification, or a combination thereof.

In an embodiment, the fat is a mixed triglyceride comprising:
a) predominantly triglycerides over diglycerides, specifically greater than or equal to 50% triglycerides, more specifically greater than or equal to 60%, yet more specifically greater than or equal to 70%, still more specifically greater than or equal to 80%, and still more specifically greater than or equal to 90% triglycerides based on the total acylglycerol content;
b) predominantly C18 triglycerides over C16 triglycerides, both saturated and unsaturated; specifically greater than or equal to 70% C18, more specifically greater than or equal to 80% C18, yet more specifically greater than or equal to 85% C18, and still yet more specifically greater than or equal to 90% C18; and less than or equal to 30% C16, specifically less than or equal to 20% C16, more specifically less than or equal to 15% C16, and still more specifically less than or equal to 10% C16 based on the total C18 and C16 content;

c) predominantly tristearin as the triglyceride, specifically greater than or equal to 30% tristearin, more specifically greater than or equal to 40% tristearin, and yet more specifically greater than or equal to 50% tristearin based on the total triglycerides;

d) low levels of tripalmitin as the triglyceride, specifically less than or equal to 20% tripalmitin, specifically less than or equal to 10% tripalmitin, specifically less than or equal to 7% tripalmitin, specifically less than or equal to 3% tripalmitin based on the total triglycerides; or e) any combination of one or more of a), b), c), and d).

The chewing gum composition comprises a fat in an amount of about 0.5 to about 15% based on the total weight of the chewing gum composition, specifically about 2 to about 12, more specifically about 4 to about 10, and still yet more specifically about 6 to about 8 based on the total weight of the chewing gum composition.

In an embodiment, the chewing gum composition can further comprise a wax, wherein the weight ratio of fat to wax is about 99:1 to about 9:91, specifically about 90:10 to about 20:80, more specifically about 80:20 to about 20:80, yet more specifically about 60:40 to about 40:60, still yet more specifically about 55:45 to about 45:55; and specifically about 50:50.

The chewing gum composition comprising a fat having a ratio of beta prime and/or beta polymorphs to alpha polymorph that is predominantly beta prime and/or beta polymorphs has a Young's modulus of at least 120 kPa, specifically at least 130 kPa, more specifically at least 140 kPa, and yet more specifically at least 150 kPa, with an upper limit of about 200 kPa.

The chewing gum composition comprising a fat having a ratio of beta prime and/or beta polymorphs to alpha polymorph that is predominantly beta prime and/or beta polymorphs has a Durometer Shore A hardness of at least 45 duros, specifically at least 46, more specifically at least 48, yet more specifically at least 50, and still yet more specifically at least 55, with an upper limit of about 60 duros.

In general the chewing gum composition comprises a gum base, a bulk sweetener, a fat, optionally a wax, and optionally an additional chewing gum ingredient as described herein, for example, a flavorant, a high intensity sweetener, a sensate, a coloring agent, or a combination thereof. The fat can be part of the gum base or it can be a separate chewing gum ingredient added separate from the gum base, or the fat can be both part of the gum base and added as a chewing gum ingredient in addition to the gum base.

As used herein, the term "gum base" refers to water insoluble material(s) and can include, for example, ingredients such as elastomers, vinyl polymers, resins, waxes, elastomer solvents, emulsifiers, plasticizers, bulking agents/fillers, fats, or a combination thereof. In an embodiment, the gum base comprises an elastomer and optionally an additional gum base ingredient, wherein the additional gum base ingredient is a vinyl polymer, a resin, a wax, a fat, an emulsifier, a filler, a softener, a plasticizer, an antioxidant, or a combination thereof.

The amount of gum base employed will vary depending upon various factors such as the type of base used, the consistency of the chewing gum desired, and the other components used in the composition to make the final chewing gum product. In general, the gum base will be present in amounts of about 5 to about 65 weight percent (wt %) based on the total weight of the chewing gum composition, specifically about 10 to about 55 wt %, more specifically about 15 to about 45 wt %, and yet more specifically about 20 to about 35 wt %.

Exemplary elastomers to be used in the chewing gum base include both natural and synthetic elastomers and rubbers, for example, substances of vegetable origin such as chicle, crown gum, nispero, rosadinha, jelutong, perillo, niger gutta, tunu, balata, gutta-percha, lechi-capsi, sorva, gutta kay, and the like, or a combination thereof. Synthetic elastomers such as butadiene-styrene copolymers, polyisobutylene, isobutyleneisoprene copolymers, polyethylene, a combination thereof, and the like, or a combination thereof are also useful. The gum base can include a non-toxic vinyl polymer, such as polyvinyl acetate and its partial hydrolysate, polyvinyl alcohol, or a combination thereof. When utilized, the molecular weight of the vinyl polymer can range from about 3,000 up to and including about 94,000. Additional useful polymers include: crosslinked polyvinyl pyrrolidone, polymethylmethacrylate; copolymers of lactic acid, polyhydroxyalkanoates, plasticized ethylcellulose, polyvinyl acetatephthalate, or a combination thereof.

Conventional additives can be included in the gum base in effective amounts such as plasticizers or softeners to provide a variety of desirable textures and consistency properties. Because of the low molecular weight of these components, the plasticizers and softeners are able to penetrate the fundamental structure of the gum base making it plastic and less viscous. Suitable plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerin, or a combination thereof. Some of these ingredients may be added at the time of gum base formation or added later during the production of the chewing gum composition.

Waxes, for example, natural and synthetic waxes, petroleum waxes such as polyurethane waxes, polyethylene waxes, paraffin waxes, microcrystalline waxes, fatty waxes, beeswax, vegetable wax, rice bran wax, candelilla wax, carnuba wax, sorbitan monostearate, tallow, propylene glycol, and the like, or a combination thereof, can also be incorporated into the gum base to obtain a variety of desirable textures and consistency properties.

The wax can be present in the gum base in an amount of about 0.1 to about 25 wt %, specifically about 3 to about 20 wt %, more specifically about 5 to about 15 wt % and yet more specifically about 8 to about 12 wt % based on the total weight of the gum base.

The gum base can contain a solid or liquid (e.g. oil) lipid material including fat. Exemplary fats include fats and oils of vegetable origin, animal origin, or a combination thereof. Suitable vegetable fats can include soybean, cottonseed, corn, almond, peanut, sunflower, rapeseed, olive, palm, palm kernel, illipe, shea, coconut, cocoa, cocoa butter, or a combination thereof. The forgoing vegetable fats can be hydrogenated to varying degrees as desired or separated by fractional crystallization. Suitable animal fats include dairy fats such as milk fat and butter. Exemplary lipid materials include triglycerides, fatty alcohols, fatty acids, or a combination thereof. The triglyceride can include medium chain triglycerides, long chain triglycerides, and the like. Specific fats include hydrogenated coconut oil, hydrogenated cottonseed oil, hydrogenated palm oil, hydrogenated palm kernel oil, hydrogenated peanut oil, hydrogenated sunflower seed oil, hydrogenated soybean oil, or a combination thereof.

The fat can be present in the gum base in an amount of about 0.5 to about 30 wt %, specifically about 2 to about 25 wt %, more specifically about 5 to about 20 wt %, yet more specifically about 10 to about 20 wt %, and still yet more specifically about 15 to about 18 wt % based on the total weight of the gum base.

The gum base can optionally contain conventional elastomer solvents to aid in softening the elastomer base component, for example resins such as polymers of alpha-pinene or beta-pinene; methyl, glycerol or pentaerythritol esters of rosins or modified rosins and gums, such as hydrogenated, dimerized or polymerized rosins, or a combination thereof; the pentaerythritol ester of partially hydrogenated wood or gum rosin; the pentaerythritol ester of wood or gum rosin; the glycerol ester of wood rosin; the glycerol ester of partially dimerized wood or gum rosin; the glycerol ester of polymerized wood or gum rosin; the glycerol ester of tall oil rosin; the glycerol ester of wood or gum rosin; the partially hydrogenated wood or gum rosin; the partially hydrogenated methyl ester of wood or rosin; and the like; or a combination thereof. The elastomer solvent can be used in amounts of about 5 to about 75 wt % base on the total weight of the gum base, and specifically about 45 to about 70 wt %.

The gum base can include effective amounts of bulking agents such as mineral adjuvants, which can serve as fillers and textural agents. Suitable mineral adjuvants include calcium carbonate, magnesium carbonate, alumina, aluminum hydroxide, aluminum silicate, talc, tricalcium phosphate, tricalcium phosphate and the like, or a combination thereof. These fillers or adjuvants can be used in the gum base in various amounts. Specifically the amount of filler, when used, can be present in an amount of about 5 to about 60 wt % based on the total weight of the gum base, and more specifically about 20 to about 30 wt %.

Suitable emulsifiers for use in the gum base include distilled monoglycerides, acetic acid esters of mono and diglycerides, citric acid esters of mono and diglycerides, lactic acid esters of mono and diglycerides, mono and diglycerides, polyglycerol esters of fatty acids, ceteareth-20, polyglycerol polyricinoleate, propylene glycol esters of fatty acids, polyglyceryl laurate, glyceryl cocoate, gum arabic, acacia gum, sorbitan monostearates, sorbitan tristearates, sorbitan monolaurate, sorbitan monooleate, sodium stearoyl lactylates, calcium stearoyl lactylates, diacetyl tartaric acid esters of mono- and diglycerides, glyceryl tricaprylate-caprate/medium chain triglycerides, glyceryl dioleate, glyceryl oleate, glyceryl lacto esters of fatty acids, glyceryl lacto palmitate, glyceryl stearate, glyceryl laurate, glycerly dilaurate, glyceryl monoricinoleate, triglyceryl monostearate, hexaglyceryl distearate, decaglyceryl monostearate, decaglyceryl dipalmitate, decaglyceryl monooleate, polyglyceryl 10 hexaoleate, medium chain triglycerides, caprylic/capric triglyceride, propylene glycol monostearate, polysorbate 20, polysorbate 40, polysorbate 60, polysorbate 80, polysorbate 65, hexylglyceryl distearate, triglyceryl monostearate, tweens, spans, stearoyl lactylates, calcium stearoyl-2-lactylate, sodium stearoyl-2-lactylate, lecithin, ammonium phosphatide, sucrose esters of fatty acids, sucroglycerides, propane-1,2-diol esters of fatty acids, or a combination thereof.

The bulk sweetener of the chewing gum composition can be a sugar-based or sugar-free bulk sweetener, specifically sugar-free. Bulk sugar sweeteners generally include saccharides. Suitable sugar sweeteners include mono-saccharides, di-saccharides and poly-saccharides, for example sucrose (sugar), dextrose, maltose, dextrin, xylose, ribose, glucose, mannose, galactose, fructose (levulose), lactose, invert sugar, fructo oligo saccharide syrups, partially hydrolyzed starch, corn syrup solids, such as high fructose corn syrup, or a combination thereof.

The bulk sweetener can also be a sugar-free bulk sweetener such as a sugar alcohol, also referred to as a "sugar polyol". The sugar alcohol can be erythritol, galactitol, isomalt, a hydrogenated starch hydrolyzate, lactitol, maltitol, mannitol, polyglycitol, sorbitol, xylitol, and the like, or a combination thereof. The sugar alcohol can be in powder form (either crystalline or amorphous), molten (melted) form having a low moisture content (e.g. less than 10 wt %, specifically less than 5 wt %), or in syrup form (also referred to as "solution") with water. Exemplary sugar alcohol syrups include sorbitol syrup, maltitol syrup, hydrogenated starch hydrolysate syrup, polyglycitol syrup, and the like.

The amount of bulk sweetener in the chewing gum composition can be about 10 to about 85 wt % based on the total weight of the chewing gum composition, specifically about 20 to about 80 wt %, more specifically about 30 to about 75 wt %, and yet more specifically about 40 to about 70 wt %.

In an embodiment, the chewing gum composition is sugar-free.

The chewing gum composition may further comprise an additional chewing gum ingredient wherein the additional ingredient is a flavorant, a fat, a high intensity sweetener, a food acid or salt thereof, a sensate, a flavor modulator or potentiator, a coloring agent, a humectant, a softener, or a combination thereof.

Exemplary flavorants (flavor, flavoring agent) for use in the chewing gum composition can include those artificial or natural flavors known in the art, for example synthetic flavor oils, natural flavoring aromatics and/or oils, oleoresins, extracts derived from plants, leaves, flowers, fruits, and the like, or a combination thereof. Nonlimiting representative flavors include oils such as spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, cassia oil, and citrus oils including lemon, orange, lime, grapefruit, vanilla, fruit essences, including apple, pear, peach, grape, strawberry, raspberry, blackberry, cherry, plum, pineapple, apricot, banana, melon, tropical fruit, mango, mangosteen, pomegranate, papaya, honey lemon, and the like, or a combination thereof.

Other types of flavorants include various aldehydes and esters such as cinnamyl acetate, cinnamaldehyde, citral diethylacetal, dihydrocarvyl acetate, eugenyl formate, p-methylamisol, acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin).

The flavorant can be used in liquid or solid form. The flavorant can be used in free form or encapsulated form. When used in solid (dry) form, suitable drying means such as spray drying a flavor oil can be used. Alternatively, the flavorant can be encapsulated, absorbed onto water soluble materials by means known in the art, for example cellulose, starch, sugar, maltodextrin, gum arabic, and the like. In an embodiment, the flavorant can be used in physical forms effective to provide an initial burst of flavor or a prolonged sensation of flavor.

More than one flavorant can be used in the chewing gum composition. The amount and type of flavorant can be chosen based on the targeted release profile and flavor intensity desired. The chewing gum composition generally comprises a flavorant in an amount of about 0.001 to about 5 wt % based on the total weight of the chewing gum composition, specifically about 0.01 to about 4 wt %, yet more specifically about 0.1 to about 3 wt %, and still yet more specifically about 1.0 to about 2 wt %.

The chewing gum composition may further contain a high intensity sweetener. A "high intensity sweetener" as used herein means agents having a sweetness greater than the sweetness of sucrose. In an embodiment, a high intensity sweetener has a sweetness that is at least 100 times that of sugar (sucrose) on a per weight basis, specifically at least 500 times that of sugar on a per weight basis. In an embodiment the high intensity sweetener is at least 1,000 times that of sugar on a per weight basis, more specifically at least 5,000 times that of sugar on a per weight basis. The high intensity sweetener can be selected from a wide range of materials, including water-soluble sweeteners, water-soluble artificial sweeteners, water-soluble sweeteners derived from naturally occurring water-soluble sweeteners, dipeptide based sweeteners, and protein based sweeteners. Combinations comprising one or more sweeteners or one or more of the foregoing types of sweeteners can be used. Without being limited to particular sweeteners, representative categories and examples include:

a) water-soluble sweetening agents such as dihydrochalcones, monellin, steviosides, rebaudiosides, glycyrrhizin, dihydroflavenol, monatin, and L-aminodicarboxylic acid aminoalkenoic acid ester amides, such as those disclosed in U.S. Pat. No. 4,619,834, or a combination thereof;

b) water-soluble artificial sweeteners such as soluble saccharin salts, i.e., sodium or calcium saccharin salts, cyclamate salts, acesulfame salts, such as the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, or a combination thereof; dipeptide based sweeteners, for example the L-aspartic acid derived sweeteners such as L-aspartyl-L-phenylalanine methyl ester (Aspartame) and materials described in U.S. Pat. No. 3,492,131, L-alpha-aspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, neotame, or a combination thereof;

c) water-soluble sweeteners derived from naturally occurring water-soluble sweeteners, such as steviosides and stevia derived compounds, for example, steviol glycosides such as rebaudiocides including rebaudiocide A, and the like, lo han quo and lo han quo derived compounds such as iso-mogroside V and the like, chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include, for example: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-furanoside, or 4,1'-dichloro-4,1'-dideoxygalactosucrose; 1',6'-dichloro1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galacto-pyranosyl-1,6-dichloro-1,6-dideoxy-beta-D-fructofuranoside, or 4,6,1',6'-tetrachloro4,6,1',6'-tetradeoxygalacto-sucrose; 4,6,1',6'-tetradeoxysucrose, or a combination thereof;

d) protein based sweeteners such as thaumaoccous danielli, talin, or a combination thereof; and e) amino acid based sweeteners.

Furthermore, the high intensity sweetener can be used in a variety of distinct physical forms, for example those known in the art to provide an initial burst of sweetness and/or a prolonged sensation of sweetness. Without being limited thereto, such physical forms include free forms (e.g., spray dried or powdered), beaded forms, encapsulated forms, or a combination thereof.

The chewing gum composition may optionally further comprise a coloring agent. Coloring agents (colors, colorants, colorings) can be used in amounts effective to produce a desired color for the chewing gum. Suitable coloring agents include pigments, which can be incorporated in amounts up to about 6 wt % based on the total weight of the chewing gum. For example, titanium dioxide can be incorporated in amounts up to about 2 wt %, and specifically less than about 1 wt % based on the total weight of the chewing gum. Suitable coloring agents also include natural food colors and dyes suitable for food, drug, and cosmetic applications.

Suitable colors include annatto extract (E160b), bixin, norbixin, astaxanthin, dehydrated beets (beet powder), beetroot red/betanin (E162), ultramarine blue, canthaxanthin (E161g), cryptoxanthin (E161c), rubixanthin (E161d), violanxanthin (E161e), rhodoxanthin (E161f), caramel (E150 (a-d)), beta-apo-8'-carotenal (E160e), beta-carotene (E160a), alpha carotene, gamma carotene, ethyl ester of beta-apo-8 carotenal (E160f), flavoxanthin (E161a), lutein (E161b), cochineal extract (E120), carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, tagetes (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminium (E173), silver (E174), gold (E175), pigment rubine/lithol rubine BK (E180), calcium carbonate (E170), carbon black (E153), black PN/brilliant black BN (E151), green S/acid brilliant green BS (E142), or a combination thereof. In an embodiment, certified colors can include FD&C aluminum lakes, or a combination thereof. A full recitation of all FD&C colorants and their corresponding chemical structures may be found in the Kirk-Othmer Encyclopedia of Chemical Technology, 4th Edition, in volume 1 at pages 492-494.

Exemplary food acids or salts thereof for use in the chewing gum can include acetic acid, adipic acid, ascorbic acid, butyric acid, citric acid, formic acid, fumaric acid, glyconic acid, lactic acid, phosphoric acid, malic acid, oxalic acid, succinic acid, tartaric acid, and alkali metal salts thereof (e.g., sodium citrate dihydrate), or a combination thereof. The food acid or salt thereof may be used in free form or in an encapsulated form.

The chewing gum composition may comprise a sensate. Exemplary sensates include cooling agents, warming agents, tingling agents, effervescent agents, or a combination thereof. Cooling agents ("coolants") are additives that provide a cooling or refreshing effect in the mouth, in the nasal cavity, or on skin. For example, among the useful cooling agents are included menthane, menthone, ketals, menthone ketals, menthone glycerol ketals, substituted p-menthanes, acyclic carboxamides, mono menthyl glutarate, substituted cyclohexanamides, substituted cyclohexane carboxamides, substituted ureas and sulfonamides, substituted menthanols, hydroxymethyl and hydroxymethyl derivatives of p-menthane, 2-mercapto-cyclo-decanone, hydroxycarboxylic acids with 2-6 carbon atoms, cyclohexanamides, menthyl acetate, menthyl salicylate, N,2,3-trimethyl-2-isopropyl butanamide (WS-23), N-ethyl-2,2-diisopropylbutanamide, N-ethyl-p-menthane-3-carboxamide (WS-3), ethyl ester of N-[[5-methyl-2-(1-methylethyl)cyclohexyl]carbonyl]glycine (WS-5), as well as the substantially pure ethyl ester of N-[[5-methyl-2-(1-methylethyl)cyclohexyl]carbonyl]glycine as disclosed in U.S. Pat. No. 7,189,760 to Erman, et al which is incorporated in its entirety herein by reference, isopulegol, menthyloxy propane diol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxaspiro[4,5]decane-2-methanol, menthyl succinate and its alkaline earth metal salts, trimethylcyclohexanol, N-ethyl-2-isopropyl-5-methylcyclohexanecarboxamide, N-(4-cyanomethylphenyl) p-menthanecarboxamide (G-180), Japanese mint oil, peppermint oil, 3-(1-menthoxy)ethan-1-ol, 3-(1-menthoxy)propan-1-ol, 3-(1-menthoxy)butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide, n-ethyl-t-2-c-6 nonadienamide, N,N-dimethyl menthyl succinamide, substituted p-menthanes, substituted p-menthane-carboxamides, 2-isopropanyl-5-methylcyclohexanol (from Hisamitsu Pharmaceuticals, hereinafter "isopregol"); menthone glycerol ketals (FEMA 3807, tradename FRESCOLAT® type MGA); 3-1-menthoxypropane-1,2-diol (from Takasago, FEMA 3784); and menthyl lactate; (from Haarman & Reimer, FEMA 3748, tradename FRESCOLAT® type ML), WS-30, WS-14, Eucalyptus extract (p-Mehtha-3,8-Diol), Menthol (its natural or synthetic derivatives), Menthol PG carbonate, Menthol EG carbonate, Menthol glyceryl ether, N-tertbutyl-p-menthane-3-carboxamide, P-menthane-3-carboxylic acid glycerol ester, Methyl-2-isopryl-bicyclo (2.2.1), Heptane-2-carboxamide; Menthol methyl ether, menthyl pyrrolidone carboxylate; 2,5-dimethyl-4-(1-pyrrolidinyl)-3(2H)-furanone; cyclic alpha-keto enamines, cyclotene derivatives such as cyclopentenes including 3-methyl-2-(1-pyrrolidinyl)-2-cyclopenten-1-one and 5-methyl-2-(1-pyrrolidinyl)-2-cyclopenten-1-one, compounds of the formula:

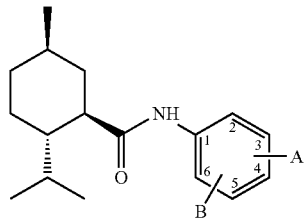

wherein B is selected from H, $CH_3$, $C_2H_5$, $OCH_3$, $OC_2H_5$; and OH; and wherein A is a moiety of the formula-CO-D, wherein D is selected from the following moieties: (i) —$NR^1R^2$, wherein $R^1$ and $R^2$ are independently selected from H and $C_1$-$C_8$ straight or branched-chain aliphatic, alkoxyalkyl, hydroxyalkyl, araliphatic and cycloalkyl groups, or $R^1$ and $R^2$ together with the nitrogen atom to which they are attached form part of an optionally-substituted, five-or six-membered heterocyclic ring; (ii) —$NHCH_2COOCH_2CH_3$, —$NHCH_2CONH_2$, —$NHCH_2CH_2OCH_3$, —$NHCH_2CH_2OH$, —$NHCH_2CH(OH)CH_2OH$ and (iii) a moiety selected from the group consisting of:

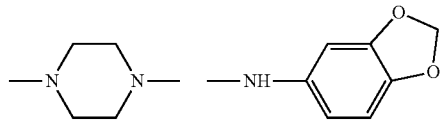

as disclosed in PCT Patent Application WO2006/125334 to Bell et al. which is incorporated in its entirety herein by reference, among others; or a combination thereof. Other compounds include the alpha-keto enamines disclosed in U.S. Pat. No. 6,592,884 to Hofmann et al. which is incorporated in its entirety herein by reference. These and other suitable cooling agents are further described in the following U.S. patents, all of which are incorporated in their entirety by reference hereto: U.S. Pat. Nos. 4,230,688; 4,032,661; 4,459,425; 4,178,459; 4,296,255; 4,136,163; 5,009,893; 5,266,592; 5,698,181; 6,277,385; 6,627,233; 7,030,273. Still other suitable cooling agents are further described in the following U.S. Published Patent Applications, all of which are incorporated in their entirety by reference hereto: U.S. 2005/0222256; 2005/0265930.

Warming agents can be selected from a wide variety of compounds known to provide the sensory signal of warming to the user. These compounds offer the perceived sensation of warmth, particularly in the oral cavity, and often enhance the perception of flavors, sweeteners and other organoleptic components. Among the useful warming agents included are vanillyl alcohol n-butylether (TK-1000) supplied by Takasago Perfumary Company Limited, Tokyo, Japan, vanillyl alcohol n-propylether, vanillyl alcohol isopropylether, vanillyl alcohol isobutylether, vanillyl alcohol n-aminoether, vanillyl alcohol isoamylether, vanillyl alcohol n-hexylether, vanillyl alcohol methylether, vanillyl alcohol ethylether, gingerol, shogaol, paradol, zingerone, capsaicin, dihydrocapsaicin, nordihydrocapsaicin, homocapsaicin, homodihydrocapsaicin, ethanol, isopropol alcohol, iso-amylalcohol, benzyl alcohol, glycerine, or a combination thereof.

In an embodiment, tingling agents may be employed to provide a tingling, stinging or numbing sensation to the user. Tingling agents include, but are not limited to: Jambu Oleoresin or para cress (*Spilanthes* sp.), in which the active ingredient is Spilanthol; Japanese pepper extract (Zanthoxylum peperitum), including the ingredients known as Saanshool-I, Saanshool-II and Sanshoamide; perillartine; 4-(1-menthoxymethyl)-2-phenyl-1,3-dioxolane; black pepper extract (piper nigrum), including the active ingredients chavicine and piperine; Echinacea extract; Northern Prickly Ash extract; trans-pellitorin, and red pepper oleoresin; or a combination thereof. In an embodiment, alkylamides extracted from materials such as jambu or sanshool may be included. Additionally, in an embodiment, a sensation is created due to effervescence. Such effervescence is created by combining an alkaline material with an acidic material, either or both of which may be encapsulated. In an embodiment, an alkaline material may include alkali metal carbonates, alkali metal bicarbonates, alkaline earth metal carbonates, alkaline earth metal bicarbonates or a combination thereof. In an embodiment, an acidic material may include acetic acid, adipic acid, ascorbic acid, butyric acid, citric acid, formic acid, fumaric acid, glyconic acid, lactic acid, phosphoric acid, malic acid, oxalic acid, succinic acid, tartaric acid or a combination thereof. Examples of "tingling" type sensates include those disclosed in U.S. Pat. Nos. 6,780,443, 6,159,509, 5,545,424, and 5,407,665, each of which is incorporated by reference herein in its entirety.

The chewing gum composition may optionally further comprise a flavor modulator or potentiator. A sweet taste can come from flavor modulators or potentiators and/or from flavorants as well as from sweeteners. Flavor potentiators can consist of materials that intensify, supplement, modify or enhance the taste or aroma perception of an original material without introducing a characteristic taste or aroma perception of their own. Flavor modulators can impart a characteristic of their own that complements or negates a characteristic of another component. In an embodiment, flavor modulators or potentiators are designed to intensify, supplement, modify, or enhance the perception of flavor, sweetness, tartness, umami, kokumi, saltiness or a combination thereof can be included. Thus, the addition of flavor modulators or potentiators can impact the overall taste of the chewing gum. For example, flavors can be compounded to have additional sweet notes by the inclusion of flavor modulators or potentiators, such as vanilla, vanillin, ethyl maltol, furfual, ethyl propionate, lactones, or a combination thereof.

Exemplary flavor modulators or potentiators include monoammonium glycyrrhizinate, licorice glycyrrhizinates, citrus aurantium, alapyridaine, alapyridaine (N-(1-carboxyethyl)-6-(hydroxymethyl)pyridinium-3-ol) inner salt, miraculin, curculin, strogin, mabinlin, gymnemic acid, cynarin, glupyridaine, pyridinium-betain compounds, neotame, thaumatin, neohesperidin dihydrochalcone, tagatose, trehalose, maltol, ethyl maltol, vanilla extract, vanilla oleoresin, vanillin, sugar beet extract (alcoholic extract), sugarcane leaf essence (alcoholic extract), compounds that respond to G-protein coupled receptors (T2Rs and T1Rs), or a combination thereof. In an embodiment, sugar acids, sodium chloride, potassium chloride, sodium acid sulfate, or a combination thereof are used. In an embodiment, glutamates such as monosodium glutamate, monopotassium glutamate, hydrolyzed vegetable protein, hydrolyzed animal protein, yeast extract, or a combination thereof are included. Further examples include adenosine monophosphate (AMP), glutathione, and nucleotides such as inosine monophosphate, disodium inosinate, xanthosine monophosphate, guanylate monophosphate, or a combination thereof. Further examples of flavor potentiator compositions that impart kokumi are also included in U.S. Pat. No. 5,679,397 to Kuroda et al.

The amount of flavor modulators, flavor potentiators, and flavorants used herein can be a matter of preference subject to such factors as the type of final product composition, the individual flavor, and the strength of flavor desired. Thus, the amount of flavoring can be varied in order to obtain the result desired in the final product and such variations are within the capabilities of those skilled in the art without the need for undue experimentation.

The chewing gum composition may optionally further comprise a humectant. Exemplary humectants include glycerin, propylene glycol, polyethylene glycol, or a combination thereof. The amount of humectant can be controlled to ensure the final chewing gum product does not unduly absorb moisture from the surrounding environment during production, packaging, storage, and use.

The chewing gum composition may further include a softener, such as those described herein for use in the gum base.

The chewing gum composition can be prepared using standard techniques and equipment known in the art.

In one exemplary process, a gum base is heated to a temperature sufficiently high to soften the gum base without adversely affecting the physical and chemical make up of the gum base, which will vary depending upon the composition of the gum base used, and is readily determined by those skilled in the art without undue experimentation. For example, the gum base can be conventionally melted to about 40° C. to about 160° C., or melted to about 150° C. to about 175° C., for a period of time sufficient to render the base molten, e.g., about thirty minutes, just prior to being admixed incrementally with the remaining ingredients of the gum base, if any, such as the plasticizer, fillers, and softener to plasticize the blend as well as to modulate the hardness, viscoelasticity and formability of the base. The chewing gum ingredients are next blended with the molten gum base. Mixing is continued until a uniform or homogeneous mixture of the chewing gum mass is obtained. The chewing gum mass can then be conditioned using traditional conditioning techniques or subjected to a heat/hold step as described herein as a means to promote the formation of beta prime and/or beta polymorph fat crystals in the chewing gum followed by cooling and conditioning to form the chewing gum composition.

In another exemplary process, chewing gum ingredients are mixed with gum base without prior melting of the gum base or gum base ingredients. Mixing is continued until a uniform or homogeneous mixture of the chewing gum composition is obtained. Within this embodiment, the gum base can be in the form of a pelletized gum base that can be softened at 40 to 50° C. rather than melting at higher temperatures.

In another embodiment, a combination of melted gum base and pelletized gum base can be used.

The formation of chewing gum products from the chewing gum compositions can be formed by a coextrusion process, a laminate process, a compression process, a rolling and scoring process, a chain die process, a rotary die process, or a cut and wrap process, or a combination thereof. The compositions used to make the chewing gum products can be formed using a batch method or a continuous method.

In an embodiment, the chewing gum composition is prepared in a continuous process as described in International Application Publication WO2013158291 System and Method for Manufacturing Chewing Gum filed 15 Mar. 2013, which is incorporated by reference herein in its entirety.

Suitable processes to make chewing gum and chewing gum products include those found in U.S. Pat. Nos. 6,254,373, and 8,226,401, and International Application No. PCT/US2016/068317 filed Dec. 22, 2016, each of which is incorporated herein in its entirety.

In an embodiment, a method of forming a chewing gum comprises forming an initial chewing gum mass comprising a gum base, a bulk sweetener, and a fat, wherein the fat in the initial chewing gum mass has a ratio of beta prime and/or beta polymorph fats to alpha polymorph fat that is predominantly alpha polymorph; heating the initial chewing gum mass to an elevated temperature just above the crystallization temperature of the fat, specifically just above the fat's alpha polymorph transition, e.g., about 35 to about 60° C., more specifically about 40 to about 55° C., and yet more specifically about 45 to about 50° C.; maintaining the initial chewing gum mass at the elevated temperature for about 20 minutes to about 6 hours, specifically about 30 minutes to about 5 hours, and more specifically about 45 minutes to about 3 hours (this is alternatively called "the hold step"); and cooling and conditioning the initial chewing gum mass to result in a conditioned chewing gum mass having a ratio of beta prime and/or beta polymorph fats to alpha polymorph fat that is predominantly beta prime and/or beta polymorphs. Within this embodiment, the fat in the conditioned chewing gum comprises about 50 to about 100% beta prime and/or beta polymorphs and the remainder alpha polymorph, specifically about 55 to about 95%, more specifically about 60 to about 90%, yet more specifically about 65 to about 85%, still yet more specifically about 70 to about 80%, and specifically about 55 to about 85%. Within this embodiment, any one or more of the heating, holding, cooling, and/or conditioning steps can be conducted at a relative humidity of about 7% to about 45%, specifically about 13% to about 40%, more specifically about 15% to about 35%, yet more specifically about 18% to about 30, and still more specifically about 24% to about 30%.

The ratio of fat polymorphs can be determined within about 60 days, specifically within about 45 days, more specifically within about 30 days, and still more specifically within about 15 days from manufacturing the conditioned chewing gum composition. In another embodiment, the ratio is determined at a time between the completion of conditioning the chewing gum and the time of packaging, wrapping, or coating the conditioned chewing gum composition.

The conditioning step can be conducted at a temperature below ambient temperature, specifically at or below 20° C., more specifically at or below 18° C., yet more specifically at or below 15° C., and still more specifically at or below 13° C.

The conditioned chewing gum has a Young's modulus of at least 120 kPa, specifically at least 130 kPa, more specifically at least 140 kPa, and yet more specifically at least 150 kPa, with an upper limit of about 200 kPa.

The conditioned chewing gum has a Durometer Shore A hardness of at least 45, specifically at least 46, more specifically at least 48, yet more specifically at least 50, and still yet more specifically at least 55, with an upper limit of about 60.

"Initial chewing gum hardness" means the hardness of a chewing gum composition just after formation and prior to a heat/hold step or conditioning.

"Conditioned chewing gum hardness" means the hardness of a chewing gum composition after a conditioning process and prior to wrapping, packaging, or coating of the chewing gum.

The process of forming a conditioned chewing gum as disclosed herein can be conducted one a shorter time scale than traditional conditioning processes. In an embodiment, the total time for the heating/holding, cooling, and conditioning steps is less than 24 hours, specifically less than 18 hours, more specifically less than 12 hours, still more specifically less than 10 hours, yet more specifically less than 8 hours, still more specifically less than 6 hours, specifically less than 4 hours, and still more specifically less than or equal to 2 hours.

The chewing gum composition can be prepared into discrete units in the form of slabs, sticks, pellets, cubes, and the like. The formation into discrete units can be achieved using a chain die, or rolling and scoring process.

The discrete units of chewing gum composition can be wrapped and packaged. Alternatively, the discrete units of chewing gum composition can be coating with a hard or soft panned coating, or other coating process as known in the art.

Also disclosed is a method of manufacturing a confection which includes providing a confectionery mass, holding the confectionery mass at a temperature between about 25° C. and about 75° C., specifically about 30° C. to about 65° C., and at a relative humidity of less than 80% for a predetermined time, and cooling the confectionery mass downstream of the holding.

Confection/confectionery as used herein includes chewing gum, chewing gum base, a chewy candy, a caramel, a nougat, a nut paste, chocolate, fudge, a fat-based candy, and a combination thereof. In an embodiment, the confection/confectionery is chewing gum.

According to an embodiment, a system for manufacturing a confection is provided including a mixing station for mixing a plurality of ingredients to form a confectionery mass or sheet and a treatment station for holding one of the confectionery mass and the confectionery sheet at a temperature between about 25° C. and about 75° C., specifically about 30° C. to about 65° C., and at a relative humidity of less than 80%, specifically about 5 to 80%, more specifically about 20 to about 70%, and yet more specifically about 30 to about 60%, for a predetermined time. The treatment station is arranged upstream from a cooling tunnel. The predetermined time can be less than or equal to about 6 hours, specifically about 5 minutes to about 5 hours, more specifically about 10 minutes to about 3 hours, yet more specifically about 15 minutes to about 1 hour, and still more specifically about 20 minutes to about 30 minutes.

Figure 8:
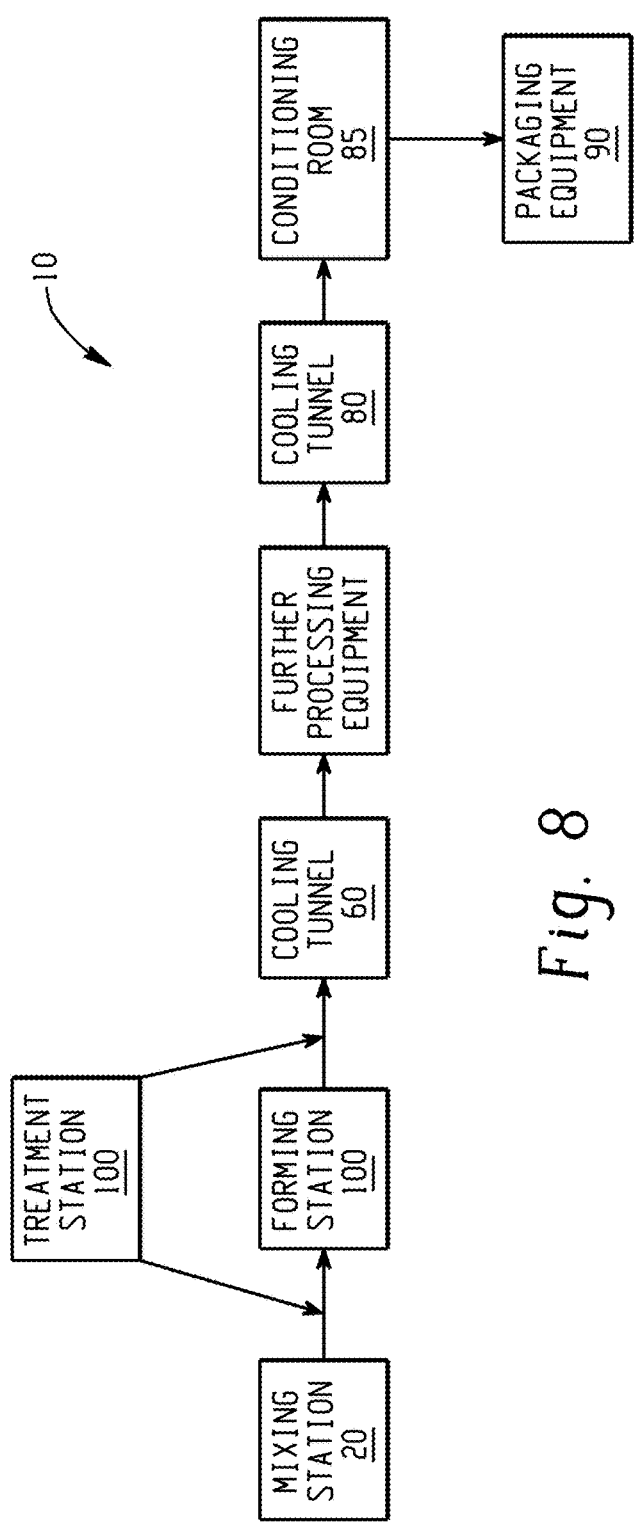
FIG. 8 shows possible positions for a treatment station in an exemplary confectionery manufacturing system 10.

In an exemplary confectionery manufacturing system 10 of FIG. 8, the mixing station 20 is configured to mix a plurality of ingredients to form a confection. The mixing station 20 may include a single mixing device, or alternatively, may include a plurality of mixing devices arranged in series and configured to make a confectionery structure or mass. The mixing station 20 may provide one or more different types of mixing depending on the type or condition of ingredients being mixed. Two primary types of mixing include distributive and dispersive mixing. Dispersive mixing is typically high shear mixing that breaks up individual ingredients and aggregations of ingredients within a composition into smaller pieces. Distributive mixing is typically lower shear mixing than dispersive mixing and is used to distribute the individual ingredients throughout the composition to provide a more uniform composition. Dispersive and distributive mixing are more thoroughly described and discussed in U.S. Pat. No. 5,562,936, the teachings and disclosure of which are hereby incorporated in their entireties by reference thereto. The confectionery manufacturing system 10 additionally includes a treatment station 100 for treating the confection. The temperature of the treatment station 100 can be between about 25° C. and about 75° C. Further, a relative humidity of the treatment station 100 is typically between about 20% and about 80%, but can be even be lower. In some embodiments, such as when the manufacturing system 10 is located in a humid area, the humidity of the treatment station 100 may be less than the ambient humidity. Holding either the confectionery mass or confectionery sheet at an elevated temperature and an ambient or target humidity for any length of time increases the hardness of the confectionery compared to a conventionally manufactured confection. In one embodiment, holding the confectionery mass or confectionery sheet at an elevated temperature increases the hardness of the confectionery mass or sheet by about 5 points, about 10 points, or about 15 points, as measured on a Shore A hardness scale. This increased hardness is retained or further increased by the additional processing that occurs throughout the remainder of the manufacturing system 10. The confectionery mass or confectionery sheet may be held at elevated conditions for less than 6 hours, less than 4 hours, less than 2 hours, less than 1 hour, or even less than 30 minutes or only 5 minutes. However, it should be understood that any length of time up to about 6 hours is within the scope of the disclosure.

The position of the treatment station 100 within the confectionery manufacturing system 10 may additionally impact the effect of the treatment station 100 on the confection. The treatment station 100 is located downstream from the mixing station 20 and upstream from the cooling station 60 and may be arranged in line with one or more of the other components of the system 10. In one embodiment, the treatment station 100 is located downstream from the mixing station 20 and upstream from a forming station 30. Alternatively, the treatment station 100 may be located downstream from the forming station 30, but upstream from cooling station 60. However, embodiments where both the confectionery mass and the confectionery sheet are held at an elevated temperature are also within the scope of the disclosure as are systems that have more than one treatment station 100.

In conventional confectionery manufacturing systems, all prior treatment to achieve a desired hardness has occurred in cold rooms, around 10° C. However, it has been found that by conditioning or holding the gum at an elevated temperature provides even higher hardness than obtained with only cold conditioning. In addition, the hardness can be sufficient so that the cold conditioning and attendant interruption can be eliminated and a complete in line operation from mixing to packaging can be achieved.

In the exemplary confectionery manufacturing system 10 of FIG. 8, there is a cooling tunnel 80, which may be similar to or different from the cooling tunnel 60 arranged directly downstream from the forming station 30. In one embodiment, such as when the confection is a pellet gum for example, the confectionery pieces may be collected and provided to a conditioning room 85 prior to being coated and/or packaged via packaging equipment 90.

It should be appreciated that although the system 10 is shown as a continuous line, in other embodiments, one or more of these components of the confectionery manufacturing system 10 may be located in different parts of a manufacturing plant or even in a different manufacturing plant.

Figure 9:
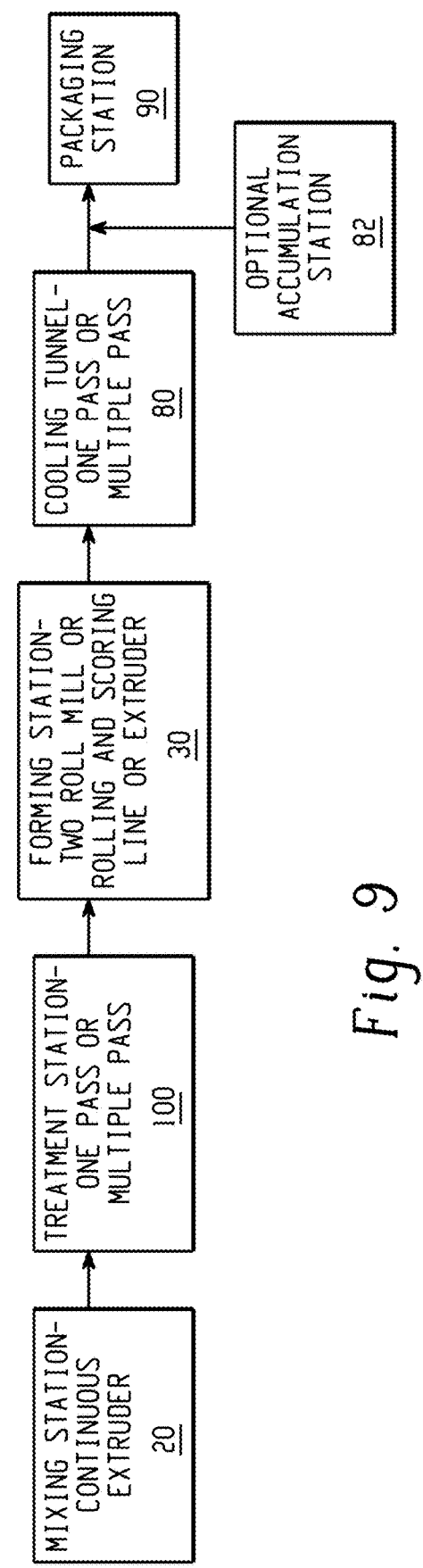
FIG. 9 shows exemplary elements of a continuous gum manufacturing and packaging line.

FIG. 9 shows exemplary elements of a continuous gum manufacturing and packaging line including a mixing station 20, which may include a continuous extruder; treatment station 100, which may be one pass or multi-pass; a forming station 30, which may be a two roll mill or a rolling and scoring line, or an extruder; a cooling tunnel 80, which may be one pass or multi-pass; a packaging station 90; and optionally an accumulation station 82, also referred to as a buffer, located upstream from the packaging station 90 to hold confectionery mass or confectionery sheets at times when the packaging station 90 is unavailable to receive input.

Figure 10:
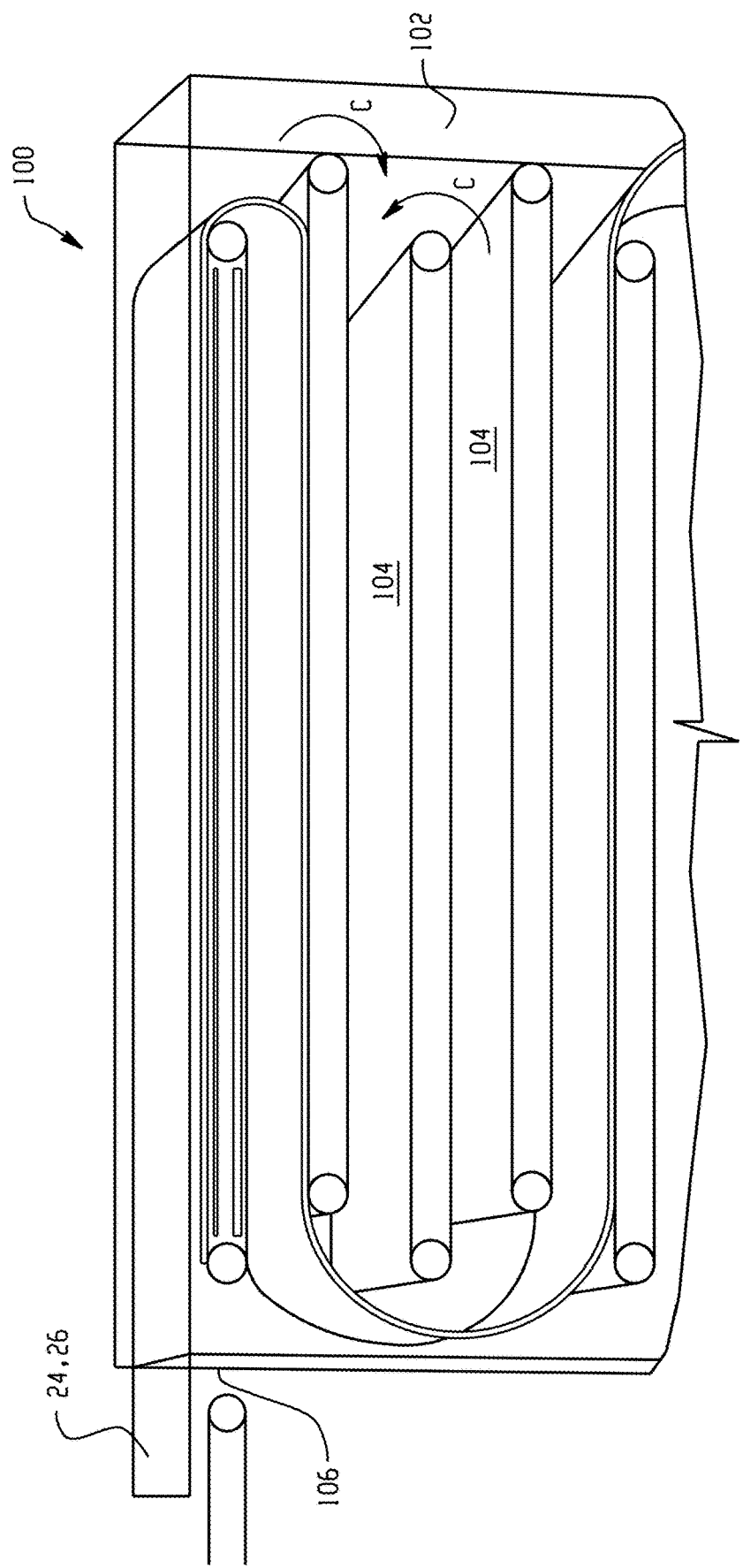
FIG. 10 shows an exemplary multi-pass treatment station.

Referring now to FIG. 10, an example of a treatment station 100 for holding the confectionery mass 24 or sheet 26 at elevated temperature conditions is illustrated. In the non-limiting embodiment, the treatment station 100 is a tunnel including an enclosure or housing 102 having at least one conveyor 104 disposed therein configured to transport the confectionery mass 24 or confectionery sheet 26 between an entry point 106 and an exit point (not shown) of the housing 102. However, embodiments where the confection is substantially stationary within the housing 102 are also within the scope of the disclosure.

The features and advantages are more fully shown by the following examples which are provided for purposes of illustration, and are not to be construed as limiting the invention in any way.

EXAMPLES

Example 1. Study of Cottonseed Fat Polymorphs on Gum Base Hardness After Undergoing a Heating/Holding Step Followed by a Conditioning Process Hydrogenated cottonseed oil and cottonseed gum base prepared from hydrogenated cottonseed oil were analyzed by X-ray diffraction (XRD) and differential scanning calorimetry (DSC) to monitor the relative amount of alpha and beta prime fat polymorphs formed under three different processes. The first process involved holding the material at 25° C. to mimic conventional conditioning. The second process involved starting the material at 25° C., heating to a temperature of 45° C. and holding at that temperature for 60 minutes and then cooling to 25° C. (13° C./minute). The third process involved starting the material at 25° C., heating to a temperature of 55° C. and holding at that temperature for 60 minutes and then cooling to 25° C. (13° C./minute). The materials were further analyzed for hardness using a TAXT2 texture analyzer to measure force in compression. Compression Method used for gum base/fat:

Test Mode: Compression
Pre-Test Speed: 0.10 mm/sec
Test Speed: 0.15 mm/sec
Post-Test Speed: 5.00 mm/sec
Target Mode: Strain
Strain: 40.0%
Trigger Type: Pre Travel
Trigger Distance: 0.000 mm
Advanced Options: Off The gradient of the force curve was used as a representation of hardness in both cottonseed fat and cottonseed gumbase. Eight data points were taken at each temperature condition and the average gradient was reported.

Table 1 reports the relative amounts of alpha and beta prime polymorphs for each process and the hardness data for each material.

TABLE 1

| Temperature (° C.) | Cottonseed Fat | | Cottonseed Gum Base | |
|---|---|---|---|---|
| | Polymorph type and relative amount | Gradient of force (N/mm) | Polymorph type and relative amount | Gradient of force (N/mm) |
| 25 | Alpha > Beta prime | 125.4 | Alpha > Beta prime | 54.5 |
| 25 → 45 → 25 | Beta prime | 144.4 | Beta prime | 75.3 |
| 25 → 55 → 25 | Alpha < Beta prime | 141.8 | Alpha < Beta prime | 63.7 |

FIG. 1 shows the rheology results of the Cottonseed Gum Base comparing three different heat/hold cycles at 25° C. (data are in linear scale). It provides shear modulus of cotton seed gum base when held at 25° C., 45° C., or 55° C. for 1 hour before cooling down to 25° C.

Texture data shows that cottonseed fat and cottonseed fat gum base are harder in texture when held at 45° C. and 55° C. versus when held at 25° C. Beta prime fat polymorph is present in higher amounts in the materials that underwent the heating/holding process. It has been found that employing a heating/holding step prior to a conditioning step creates polymorphic transitions in the fat, yielding more beta prime polymorphs over alpha polymorph and thus resulting in higher gum base hardness. Likewise, higher gum base hardness would in turn result in higher chewing gum hardness when the chewing gum is prepared with the gum base comprising fat and exposed to the heating/holding step.

Example 2. Differential Scanning Calorimetry Study of Pure Fats to Monitor Polymorphs Formed After a Heating/Holding Step Pure fats were analyzed in a DSC study to monitor the type and amount of fat polymorphs after a heat-cool-heat at 10° C./minute method was conducted. In the "20° C. method" samples were left at 20° C. isothermal for two hours after the cooling step. In the "45° C.-20° C. method" samples were left at 45° C. iso for two hours before cooling. The data indicated in Table 2 is from the second heat, where "MP" is melting point.

TABLE 2

| Method | MP Peak 1 | Enthalpy Peak 1 | MP Peak 2 | Enthalpy Peak 2 | Alpha: (Beta prime + Beta) |
|---|---|---|---|---|---|
| Hydrogenated Palm fat | | | | | |
| 20° C. | 47.7 | 79.7 | 57.2 | 40.3 | 66.67:33.33 |
| 45° C.-20° C. | | | 58.9 | 156.2 | 0:100 |
| Hydrogenated Cottonseed fat | | | | | |
| 20° C. | 51.4 | 63 | 60.9 | 46 | 50:50 |
| 45° C.-20° C. | | | 58.9 | 156.2 | 0:100 |
| Hydrogenated Soybean fat | | | | | |
| 20° C. | 53.7 | 113.8 | 61.7 | 18.0 | 85:15 |
| 45° C.-20° C. | | | 63.7 | 149.1 | 0:100 |

Example 3. Study of Chewing Gum Hardness for Chewing Gum Made with Various Fat Types Five chewing gums were prepared, each containing a different types of fats: "All Fat" (65% hydrogenated cottonseed, 35% hydrogenated soybean), "Cottonseed" hydrogenated cottonseed fat, "Palm" hydrogenated palm fat, "Soy" hydrogenated soybean fat, and "Sunflower" hydrogenated sunflower seed fat. The triglyceride profile of each fat is provided in Table 3, which shows Soy and Sunflower have lower levels of C16 triglycerides and higher levels of C18. Both Cottonseed and Palm have high mixed triacylglycerol (TAG) and Sunflower has high diacylglycerol (DAG).

The chewing gum formulations were prepared from 6.08 wt % fat, 28 wt % gum base, 44.67 wt % sorbitol, 6.5 wt % mannitol, 7.06 wt % talc, 3 wt % flavor, and the remainder of encapsulated flavor, high intensity sweeteners, softeners, and colors. The only difference between the formulations is the type of fat.

Four additional chewing gums were prepared:
f) "No Fat No Wax" contained 22 wt % gum base, 50.67 wt % sorbitol, 6.5 wt % mannitol, 7.08 wt % talc, 3 wt % flavor, and the remainder of encapsulated flavor, high intensity sweeteners, softeners, and colors;
g) "Control Blend" contained 4.72 wt % Cottonseed:Soy 65:35 (0.25 C 16:C18), 1.36 wt % microcrystalline wax, 28 wt % gum base, 44.67 wt % sorbitol, 6.5 wt % mannitol, 7.06 wt % talc, 3 wt % flavor, and the remainder of encapsulated flavor, high intensity sweeteners, softeners, and colors;
h) "Control Blend No Flavor" containing the same ingredients as "Control blend", but without the flavor; and additional sorbitol;
i) "All Wax" containing 6.08 wt % microcrystalline wax, 28 wt % gum base, 44.67 wt % sorbitol, 6.5 wt % mannitol, 7.06 wt % talc, 3 wt % flavor, and the remainder of encapsulated flavor, high intensity sweeteners, softeners, and colors.

The chewing gums were prepared and tested for Young's Modulus (Pa) at time zero ("T0") and 28 hours after conditioning at 13° C. at 24% RH ("T0-28"). The results are provided in Table 4A for the single fat samples and Table 5A for the remaining samples. The chewing gums were also tested for Young's Modulus (Pa) at time zero ("T0") and 28 hours after conditioning at 45° C. at 30% RH ("T0-28"). The results are provided in Table 4B for the single fat samples and Table 5B for the remaining samples.

TABLE 3

| Fat type | DAG:TAG | C16:0 saturated | C18:0 saturated | Total unsaturates | Other saturates | C16:C18 | % SSS[1] | % PPP[2] |
|---|---|---|---|---|---|---|---|---|
| Sunflower | 44.2:55.7 | 8.35 | 89.02 | 0.69 | 1.94 | 0.09 | 53 | 2 |
| Soy | | 11.89 | 85.69 | 0.71 | 1.71 | 0.14 | 46 | 3 |

TABLE 3-continued

| Fat type | DAG:TAG | C16:0 saturated | C18:0 saturated | Total unsaturates | Other saturates | C16:C18 | % SSS[1] | % PPP[2] |
|---|---|---|---|---|---|---|---|---|
| Cottonseed | 25.2:74.8 | 23.63 | 73.16 | 1.03 | 2.18 | 0.32 | 31 | 2 |
| Palm | 22.3:77.7 | 56.56 | 37.59 | 3.17 | 2.68 | 1.5 | 2 | 38.7 |
| All Fat | | 19.52 | 77.55 | 0.918 | 2.02 | 0.25 | | |

[1]Tristearin.
[2]Tripalmitin.

TABLE 4A

13° C. at 24% RH

| | Young's Modulus (Pa) | |
|---|---|---|
| Fat type | T0 | T0-28 |
| All Fat | 77184 | 119617 |
| Cottonseed | 97792 | 110739 |
| Palm | 87850 | 120986 |
| Soy | 101229 | 118456 |
| Sunflower | 99504 | 112929 |

The study revealed that chewing gum made from Palm gum base is brittle and has been observed to be problematic for processability. The change in Young's Modulus for the chewing gum after six hours of conditioning revealed the following trend Palm, All Fat>Soy>Sunflower, Cottonseed. Soy gum is firmest within 6 hours. The Soy, Sunflower, and Palm have highest absolute Ym over time (data not shown in Table 4A). Cottonseed provided the softest chewing gum over time. All Fat had lower initial Ym compared to Soy and Cottonseed due to the mix of triglcyerides, but increased in Ym over time more similar to the results for Soy.

TABLE 4B

45° C. at 30% RH

| | Young's Modulus (Pa) | | |
|---|---|---|---|
| Fat type | T0 | T0-T6 | T0-28 |
| All Fat | 77184 | 136609 | 138520 |
| Cottonseed | 97792 | 119874 | 139031 |
| Palm | 87850 | 176325 | 168650 |
| Soy | 101229 | 169624 | 179697 |
| Sunflower | 99504 | 140293 | 132381 |

The 45° C. at 30% RH study revealed that chewing gum made from "All fat" and the single fats reached the target Ym within 6 hours Table 4B. The change in Ym in 6 hours: Palm>soy>all fat>sunflower>cottonseed. Chewing gum made from Soy or Palm had the highest absolute Ym over time. Palm gum was the softest at the beginning, but had the highest increase in Ym when conditioned at 45° C. at 30% RH. All chewing gums reached the targeted Ym by heating/holding at 45° C. for 4 hours.

TABLE 5A

13° C. at 24% RH

| | Young's Modulus (Pa) | |
|---|---|---|
| Sample | T0 | T0-28 |
| All Fat | 77184 | 119617 |
| No Fat No Wax | 153053 | 157618 |
| All Wax | 79150 | 98636 |
| Control Blend | 60817 | 100785 |
| Control Blend No Flavor | 152491 | 213900 |

As shown in Table 5A, the initial Ym trend for chewing gum conditioned at 13° C. at 24% RH: No Fat No Wax, Control Blend No Flavor>All Fat, All Wax>Control Blend. The change in Ym in 6 hours (data not shown) Control Blend and Control Blend No Flavor>All Fat>All Wax>No Fat No Wax. Control Blend No Flavor had the highest Ym at 6 hours and over time. Fat/wax crystallization primarily provides 0-6 hours increase in Ym. Not wishing to be bound by theory, but the fat and wax may affect each other's crystallization in the Control Blend, taking a longer time to crystallize, form polymorphs and stabilize compared to chewing gum containing only fats or containing fast crystallizing wax. The results in Table 5A suggests flavor binds to fats and/or wax and hinders crystallization as well as potentially plasticizing the gum base polymer thereby lowering Ym.

TABLE 5B

45° C. at 30% RH

| | Young's Modulus (Pa) | | |
|---|---|---|---|
| Sample | T0 | T0-T6 | T0-28 |
| All Fat | 77184 | 136609 | 138520 |
| No Fat No Wax | 153053 | 198487 | 213882 |
| All Wax | 79150 | 134620 | 155196 |
| Control Blend | 60817 | 119984 | 153114 |
| Control Blend No Flavor | 152491 | 234911 | 249906 |

As shown in Table 5B, when conditioned at 45° C. at 30% RH, the following trend in change in Ym in 6 hours was observed: Control Blend No Flavor>Control Blend>All Fat, All Wax>No Fat No Wax. Control Blend No Flavor had the highest Ym at 6 hours and over time. All chewing gums reach target Ym by heating holding at 45° C. for 4 hours. All Wax had slightly higher Ym than All Fat, but decreased over time. Control Blend reaches highest Ym over time, better than All Fat and All Wax chewing gums. The results suggest that slow crystallization and polymorph formation in Control Blend due to fat-wax interactions, results in continuous increase in Ym over time.

Figure 2:
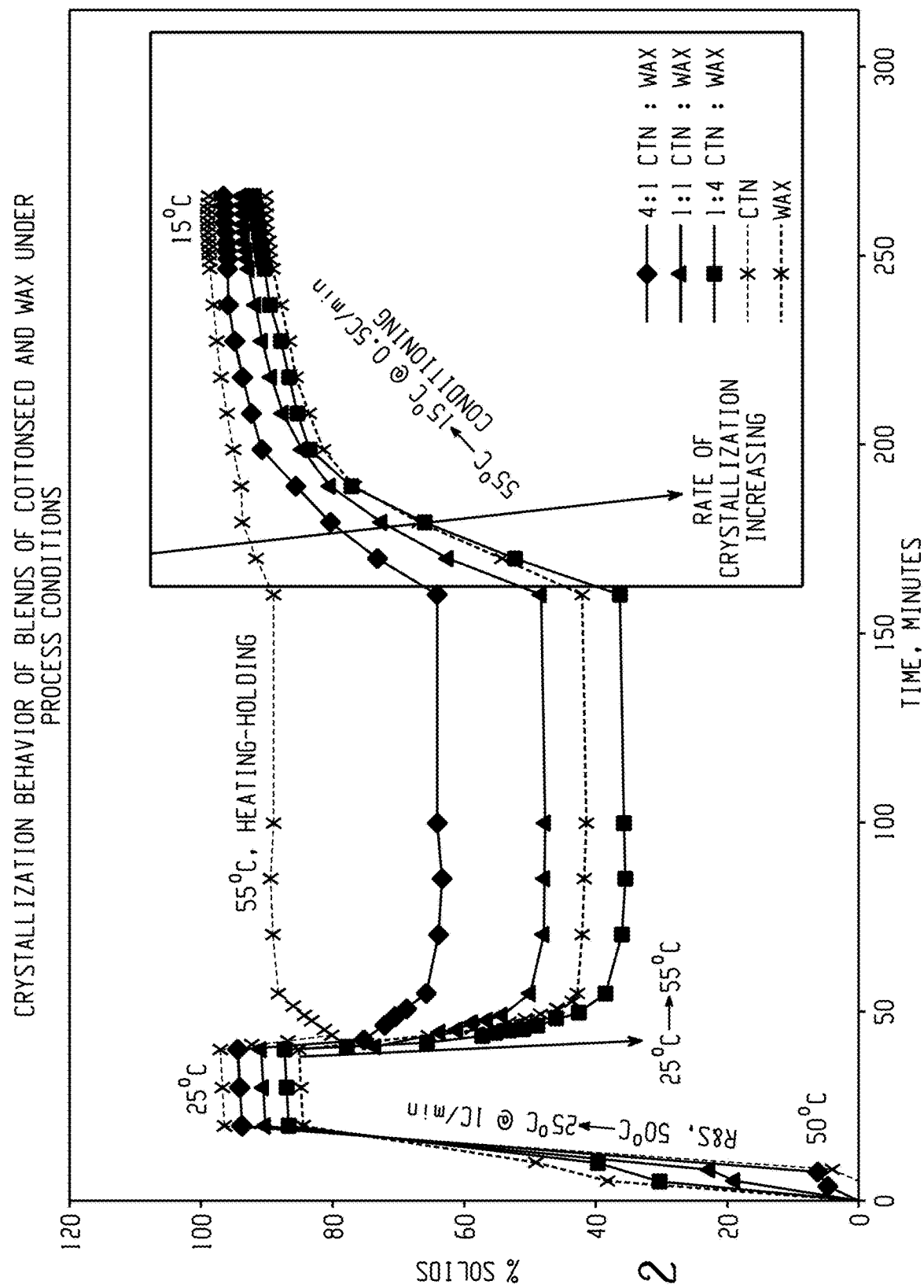
FIG. 2 is a graph illustrating the crystallization behavior of different blends of hydrogenated cottonseed oil and wax under process conditions.

Example 4. Study of Fat and Wax Interactions and Their Effect on Chewing Gum Hardness The crystallization behavior of different blends of hydrogenated cottonseed fat and microcrystalline wax under a process condition involving a heating/holding step followed by a conditioning process was studied. Using pulsed nuclear magnetic resonance (NMR) spectroscopy, the percent solids content for each blend was measured over time while the temperature was adjusted as shown in FIG. 2. The results of the study revealed that a 4:1 weight ratio of cottonseed:wax achieved higher % crystallized solids at both 55° C. and 25° C., than 1:1 and 1:4 This indicates a lower amount of wax will allow for more crystallization and therefore a higher increase in hardness.

Example 5. Pulsed NMR Spectroscopy Studies on the Effects of Wax on Crystallization of Fats Pulsed nuclear magnetic resonance (NMR) spectroscopy studies were conducted on different blends of fat and microcrystalline wax under a process condition involving a heating/holding step at either 45° C. or 55° C., followed by a conditioning process. The fats included "Soy" hydrogenated soybean fat, "Sunflower" hydrogenated sunflower seed fat, "Cottonseed" hydrogenated cottonseed fat, and "Palm" hydrogenated palm fat. The percent solids content is reported in Table 5 according to the formula (Experimental Solids−Calculated Solids)/Calculated Solids.

TABLE 5

| Fat:Wax weight ratio | Heating/ Holding temperature (° C.) | Soy | Sunflower | Cottonseed | Palm |
|---|---|---|---|---|---|
| 4:1 | 45 | −2.37 | 1.23 | −4.55 | −6.98 |
| 4:1 | 55 | −13.72 | −12.48 | −19.94 | −9.54 |
| 1:1 | 45 | −3.44 | −7.38 | −5.47 | −11.72 |
| 1:1 | 55 | −23.57 | −21.60 | −26.96 | −32.90 |
| 1:4 | 45 | −3.14 | −7.88 | −4.83 | −12.79 |
| 1:4 | 55 | −27.02 | −30.29 | −28.99 | −35.45 |

The results of the study show All Fat:wax blends reach a similar % solids content at both 45° C. and 55° C., but lower than pure fats. The 4:1 Fat:Wax blends showed a trend for retardation in crystallization at 45° C. for Sunflower (1.2%) <Soy (−2%)<Cottonseed (−5%)<Palm (−7%); and a retardation in crystallization at 55° C. due to a decrease in % solids at 55° C. Palm (−10%)<Sunflower (−12%)<Soy(−14%)<Cottonseed (−20%). The 1:1 Fat:Wax blends showed a trend for retardation in crystallization at 45° C. for Soy (−3%)<Cottonseed (−5%)<Sunflower (−7%)<Palm (−12%); and a retardation in crystallization at 55° C. due to a decrease in % solids at 55° C. for Sunflower (−22%)<Soy (−24%) <Cottonseed (−27%)<Palm (−33%). The 1:4 Fat:Wax blends showed a trend for retardation in crystallization at 45° C. for Soy (−3%)<Cottonseed (−5%)<Sunflower (−7%) <Palm (−13%); and a retardation crystallization at 55° C. due to decrease in % solids at 55° C. for Soy (−27%) <Cottonseed (−28%)<Sunflower (−28%)<Palm (−35%).

Example 6. DSC Studies on the Effects of Wax on the Formation of Fat Polymorphs

DSC curves were obtained on full fats and two different blends of fat and microcrystalline wax (4:1 and 1:4 weight ratios) to study the effect of wax on the formation of fat polymorphs. The fats included "Palm" hydrogenated palm fat, "Sunflower" hydrogenated sunflower seed fat, "Cottonseed" hydrogenated cottonseed fat, and "Soy" hydrogenated soybean fat. The heating conditions were 20-85-20° C. (isothermal 120 min)-85° C. A similar trend was found for all four fats where the presence of wax increases the viscosity of the fat/wax mixture, which promotes the formation of lower fat polymorphs.

Based on the results in Examples 4-6 the following conclusions can be made. Wax lowers melting points of fats in fat-wax blends, increases viscosity, retards crystallization, increases alpha polymorph content and can be used as a tuning agent for texture, softness in low melting point fat chewing gums, such as those made with hydrogenated palm fat. Hydrogenated palm fat affected most by wax in blends for crystallization and melting point, while hydrogenated soybean fat and hydrogenated sunflower seed fat were affected the least by wax. Fat:wax blends can range from 10:1 to 1:10, specifically between 4:1 and 1:4, based on melting point of the fats used and desired fat polymorphs for texture. Wax was found to lower the melting point of fats and thereby can be used in chewing gum formulations to lower the heat-hold step used to increase beta prime and/or beta fat polymorph content in chewing gum compositions prepared using high melting point fats. The alpha:beta prime fat polymorph ratio is higher in fat-wax blends due to slow polymorphism in highly viscous matrix. The higher the wax content, the more the fat crystallization is affected. Control Blend gum (65% cottonseed, 35% soy) with fat:wax=3.5:1 performs the poorest.

Example 7. DSC and Texture Studies on the Interactions of Sorbitol and Fat in Chewing Gum Chewing gum slabs were prepared using sorbitol as the bulk sweetener and a hydrogenated fat, selected from hydrogenated soybean, cottonseed, sunflower, or palm. The DSC method used a heat cycle of 3° C./minute. The Sorbitol and Fat enthalpy peaks are reported in Table 6 along with the Young's modulus. The Sorbitol melting peak seen in chewing gum is usually between 80-85° C. In an embodiment, to obtain a chewing gum having a Young's modulus of at least 120,000 Pa, the enthalpy of the Sorbitol peak is above 42.0 J/g and the enthalpy of the Fat peak is below 6 J/g.

TABLE 6

| Time (hours) | Sorbitol Enthalpy (J/g) | Fat Peak Enthalpy (J/g) | Ym (Pa) |
|---|---|---|---|
| 47 | 43.2 | 1.6 | 135285 |
| 48 | 46.9 | 9.8 | 115970 |
| 170 | 43.3 | 5.6 | 135566 |
| 0 | 41.7 | 5.3 | 97793 |

Example 8. Differential Scanning Calorimetry Study of Hydrogenated Fats, Hydrogenated Fats+Wax, Gum Base, and Chewing Gum to Monitor Fat Polymorphs Present After Formation, After Conditioning, and After a Heating/Holding Step Followed by Conditioning Four sets of sample materials were analyzed by DSC to determine the amount of alpha fat polymorph and beta/beta prime fat polymorph.

The first set of sample materials were hydrogenated fats of the following types: Soybean, Sunflower, Cottonseed, and Palm.

The second set of sample materials were mixtures of hydrogenated fats and microcrystalline wax in two ratios, 80 wax:20 fat and 80 fat:20 wax. The fats used in the second set were hydrogenated fats of the following types: Soybean, Sunflower, Cottonseed, and Palm.

The third set of sample material was cottonseed gum base containing 21.5% hydrogenated cottonseed and the balance softeners, lecithin, butyl rubber, and talc.

The fourth set of sample materials were chewing gum compositions containing a fat, a wax, or both fat and wax: Soybean, Sunflower, Cottonseed, Palm gum, Wax gum, and Control Gum (soybean, cottonseed, wax).

The study used a Discovery DSC and 3-8 mg of ingredient(s) measured in a hermetically sealed DSC pan. Set up heat/hold conditions on the DSC and monitor heat flow vs temperature over time. Program used: 1st heat 20-80° C.—at 13° C./min; Cool 80° C.-20° C.—at 13° C./min.; Isothermal at 20° C. for 1 hour; 2nd heat 20° C.-80° C. at 13° C./min. The fourth set of sample material went through a heat-cool-heat at 3° C./min.

Figure 3:
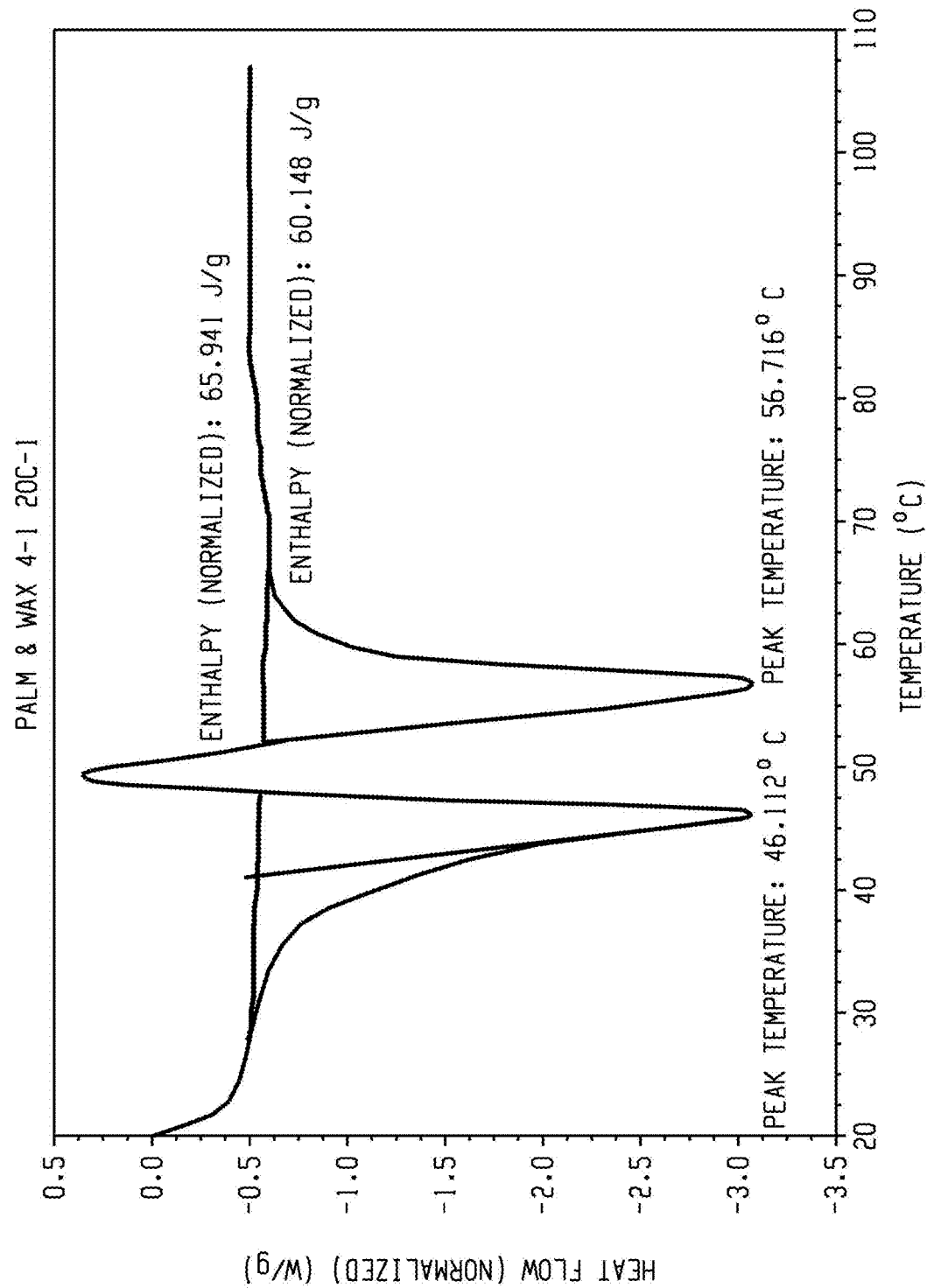
FIG. 3 is a representative DSC trace for a mixture of hydrogenated palm fat and microcrystalline wax.

FIG. 3 shows a representative DSC trace for a mixture of hydrogenated palm fat and microcrystalline wax where there is the presence of an alpha fat polymorph peak (left peak) and a beta-prime fat polymorph peak (right peak). From the calculated enthalpy data, the ratio of alpha fat polymorph and beta/beta prime fat polymorph can be determined.

Example 9. XRD Study of Hydrogenated Fats, Hydrogenated Fats+Wax, Gum Base, and Chewing Gum to Monitor Fat Polymorphs Present After Formation, After Conditioning, and After a Heating/Holding Step Followed by Conditioning Four sets of sample materials were analyzed by XRD to determine the amount of alpha fat polymorph and beta/beta prime fat polymorph.

The first set of sample materials were hydrogenated fats of the following types: Soybean, Soy, Cottonseed, and Palm.

The second set of sample materials were mixtures of hydrogenated fats and microcrystalline wax in two ratios, 80 wax:20 fat and 80 fat:20 wax. The fats used in the second set were hydrogenated fats of the following types: Soybean, Soy, Cottonseed, and Palm.

The third set of sample material was cottonseed gum base containing 21.5% hydrogenated cottonseed and the balance softeners, lecithin, butyl rubber, and talc.

The fourth set of sample materials were chewing gum compositions containing a fat, a wax, or both fat and wax: Soybean, Sunflower, Cottonseed, Palm gum, Wax gum, and Control Gum (soybean, cottonseed, wax).

For each sample of the first, second, and third set of sample materials analyzed, all sample ingredients were melted and mixed on a hot plate until the sample formed a homogeneous mixture. An XRD sample holder was then heated up on a hot plate and the sample was poured into the sample holder to a level that was flush with the top of the sample holder. For the cottonseed gum base sample, small pieces of gum base were directly melted onto the sample holder and a silicon baking mold was used to flatten the top of the sample.

The sample was then taken off of the hot plate and either allowed to cool at room temperature (20° C.) for 1 hour (fast cooling), or placed in an incubator for 1 hour which was ramped down from 70° C. to 20° C. at 1° C./minute (slow cooling). The sample was then placed in another incubator at the desired crystallization temperature (45° C., 55° C., or 60° C.) for 1 hour. After crystallization at high temperatures, the sample was again placed at room temperature (20° C.) for 1 hour.

An XRD spectrum was taken at the end of each hour using a Rigaku Miniflex600 XRD. The XRD sample holder was placed inside the XRD and scan was run using the following conditions:

Start (deg): 1

Stop (deg): 30

Step (deg): 0.020

Speed (deg/min): 3.000

Voltage (kV): 40

Current (mA): 15.

Figure 4A:
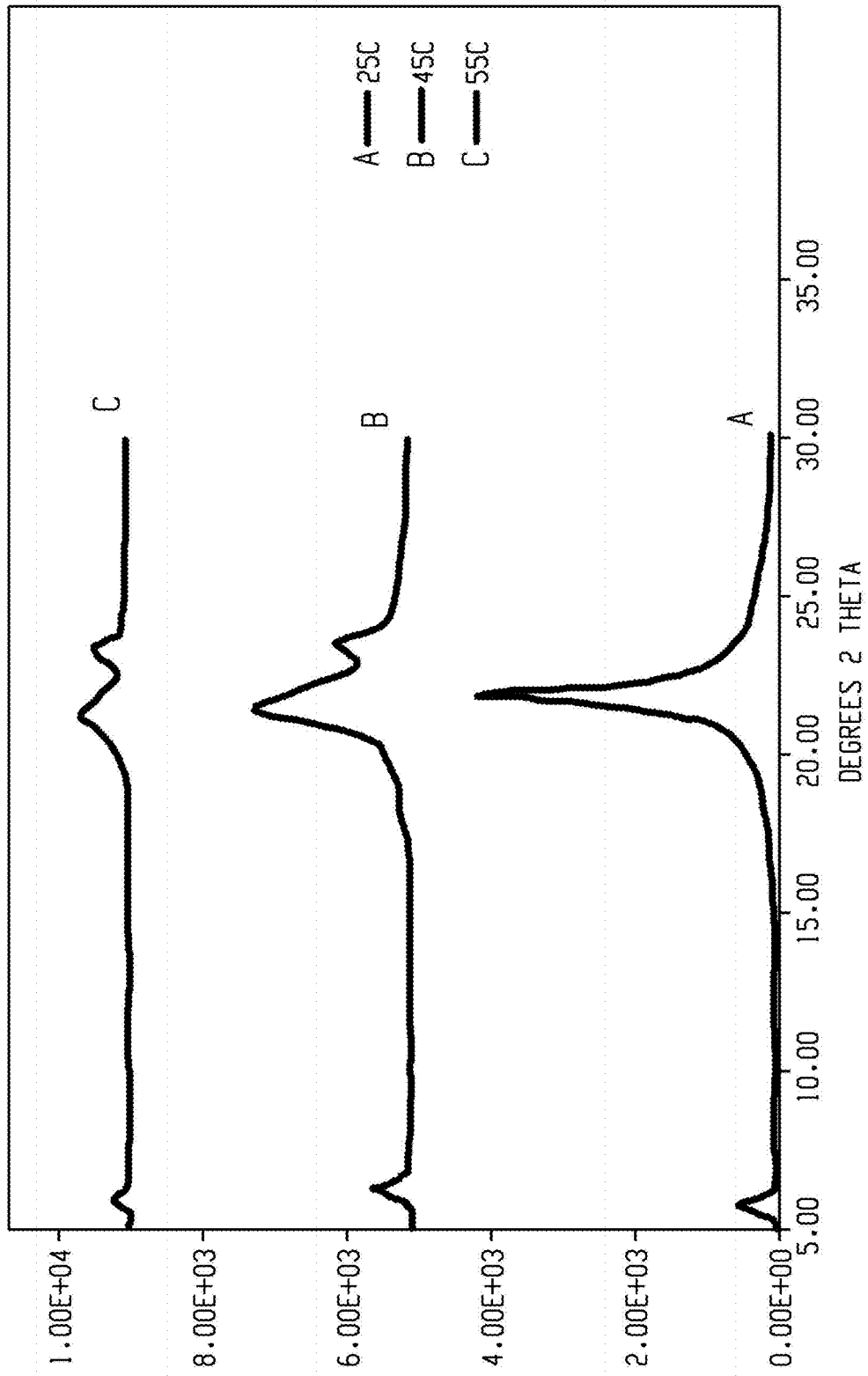
FIG. 4A is an XRD trace of cottonseed fat cooled under three conditions: 25° C. (trace A), heat/hold step at 45° C. (trace B), and a heat/hold step at 55° C. (trace C).
Figure 4B:
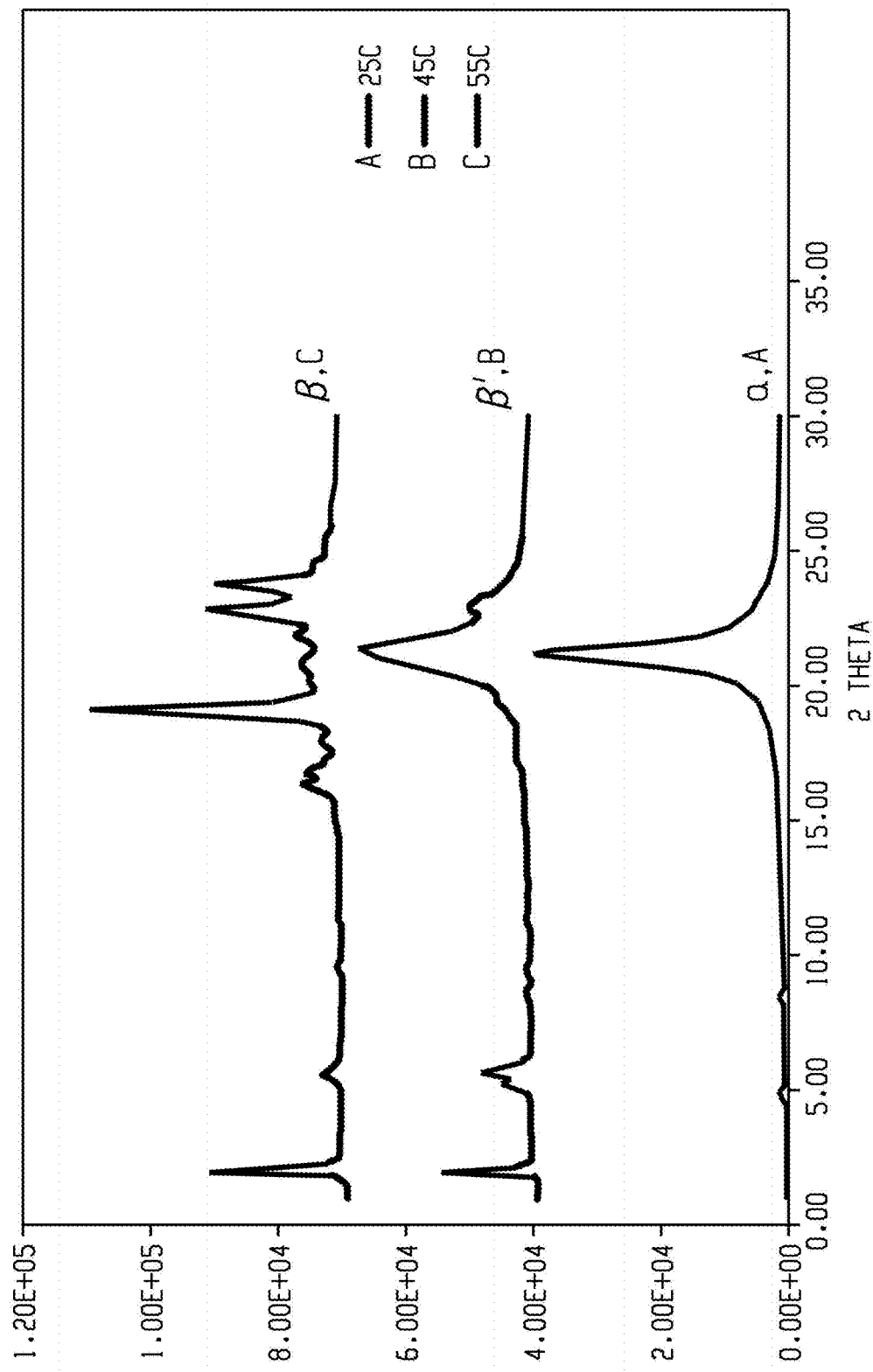
FIG. 4B is an XRD trace of sunflower fat cooled under three conditions: 25° C. (trace A), heat/hold step at 45° C. (trace B), and a heat/hold step at 55° C. (trace C) for 1 hour.

FIG. 4A is an XRD trace of cottonseed fat cooled under three conditions: 25° C. (trace A), heat/hold step at 45° C. (trace B), and a heat/hold step at 55° C. (trace C). The bottom trace at 25° C. exhibited all alpha fat polymorph while the traces for the samples held at 45/55° C. exhibited beta prime fat polymorph peaks. From such data, the ratio of alpha fat polymorph and beta/beta prime fat polymorph can be determined. Likewise, FIG. 4B is an XRD trace of sunflower seed fat cooled under three conditions: 25° C. (trace A), heat/hold step at 45° C. (trace B), and a heat/hold step at 55° C. (trace C) for 1 hour. Sunflower oil, when heated and held at 55° C. for 1 hour crystallizes into the beta polymorph. The other fats, which include soybean, palm and cottonseed oil, do not show this behavior.

The chewing gum compositions of the fourth set of sample materials were analyzed by XRD according to the following procedure. For each Sample prep:

1) Take 1 or 2 slabs of gum and pressed them onto a XRD sample holder, making sure that the height of the sample is flush with the sample holder 2) Run the sample on a Rigaku pxRD Miniflex under the following conditions:

Start (deg): 1

Stop (deg): 60

Step (deg): 0.020

Speed (deg/min): 5.000

Voltage (kV): 40

Current (mA): 15

The XRD data was scanned between 2-theta 20 degrees and 2-theta 30 degrees to identify peaks. The presence of three characteristic tall peaks at 19.9 (+/−0.5) 2-theta, 22.3 (+/−0.5) 2-theta, and 22.6 (+/−0.5) 2-theta indicates that the fat has crystallized into the beta polymorph. To quantify the beta prime fat polymorph to alpha fat polymorph ratio, identify peaks at 21.1+/−0.1 2-theta (beta prime) and 21.5+/−0.1 2-theta (alpha) (the second peak will appear as a shoulder to the first peak). Next the peak heights of these two individual peaks are determined and used to calculate the ratio of the two peaks. The ratio of the first peak to the second peak provides the relative concentration of beta prime to alpha as the peak height can be influenced by several factors including orientation, crystal size, etc. Because the peaks are relatively close in the spectrum, if both peaks are not present, one cannot confirm absence of either polymorph.

Figure 5:
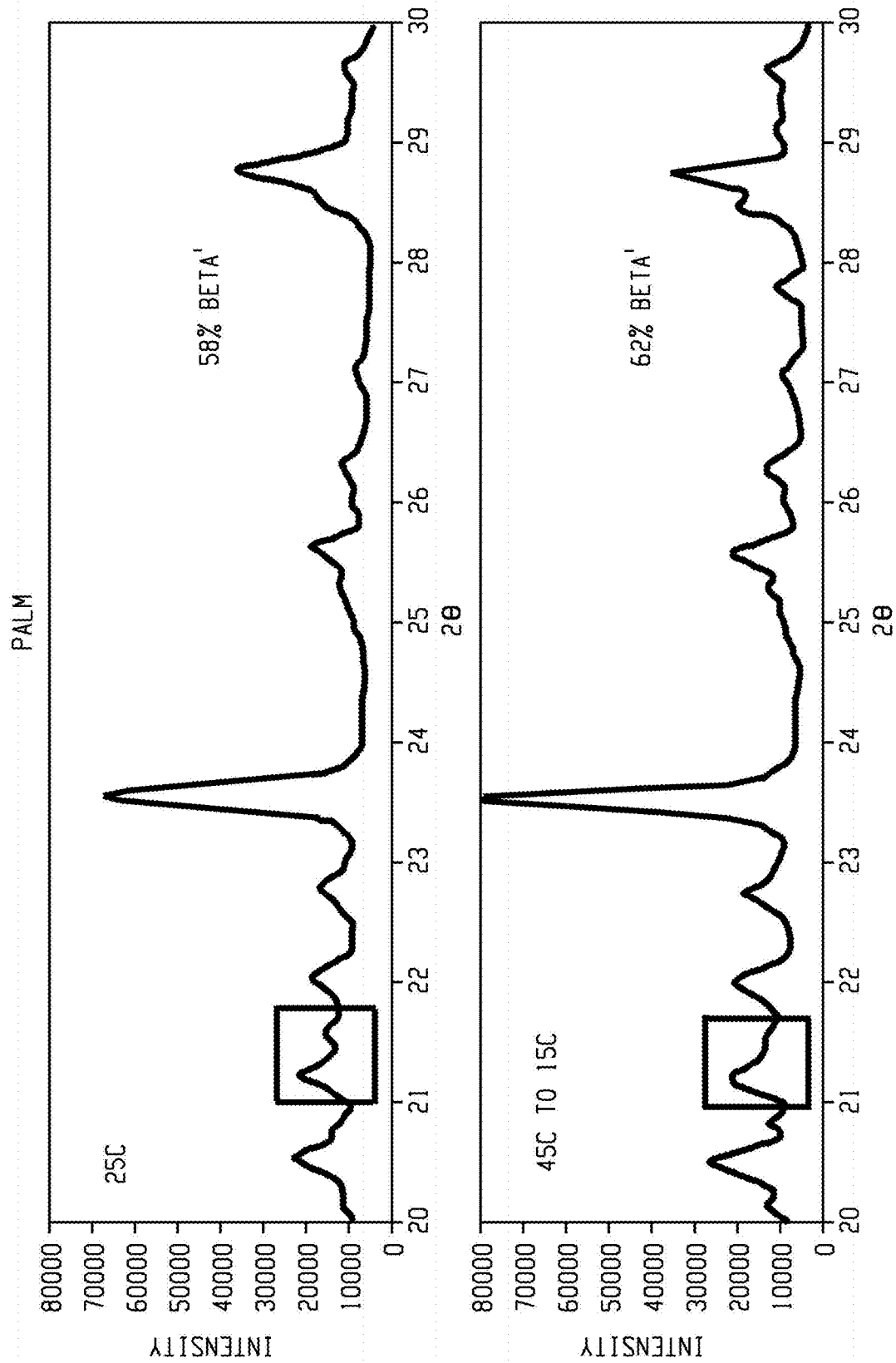
FIG. 5 shows two XRD traces of palm fat chewing gum conditioned at 13° C. (top trace) and conditioned after a heat/hold step at 45° C. (bottom trace).

FIG. 5 shows two XRD traces of Palm Chewing Gum conditioned at 13° C. (top trace) and conditioned after a heat/hold step at 45° C. (bottom trace).

Figure 6:
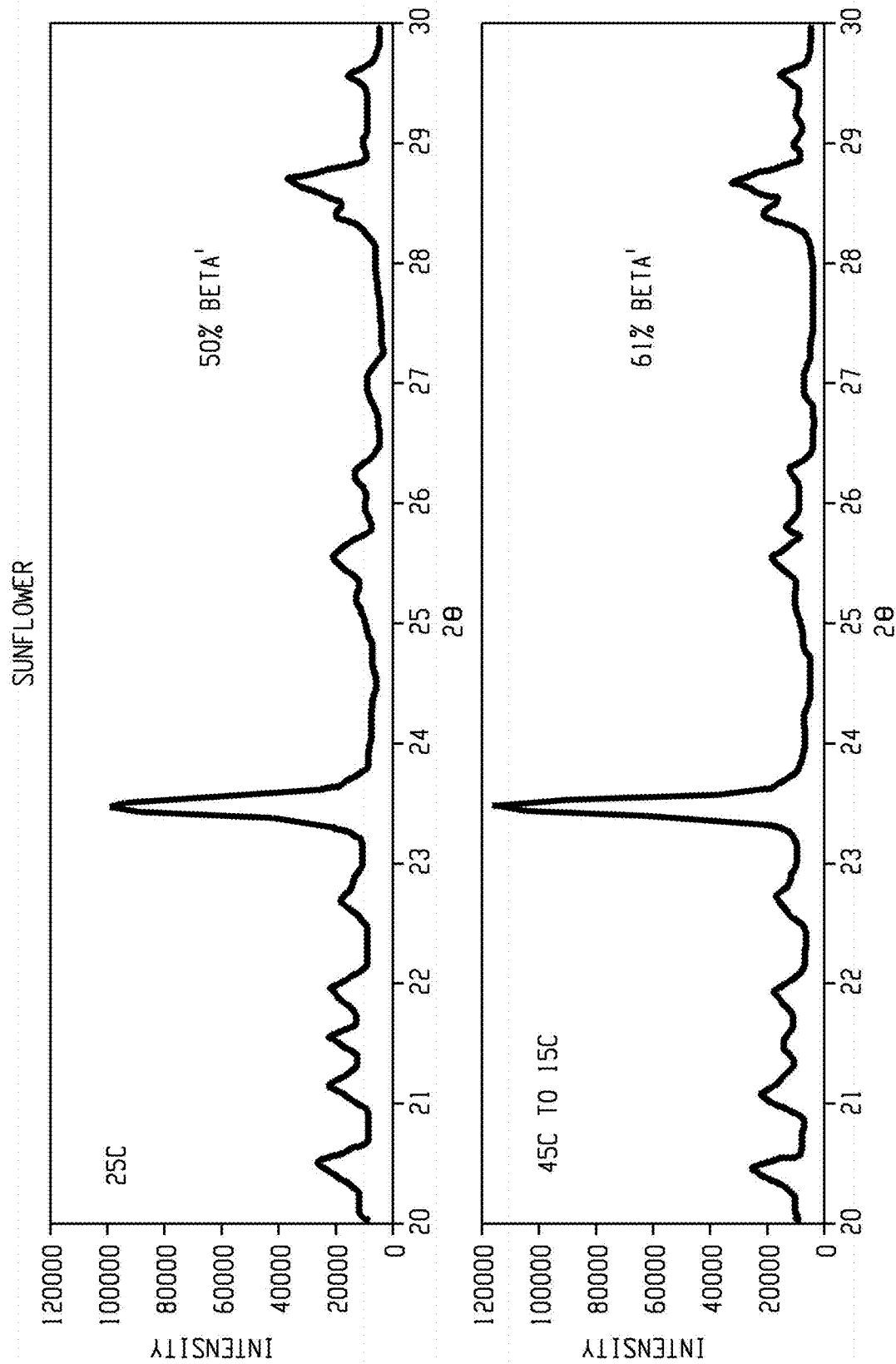
FIG. 6 shows two XRD traces of sunflower seed fat chewing gum conditioned at 13° C. (top trace) and conditioned after a heat/hold step at 45° C. (bottom trace).

FIG. 6 shows two XRD traces of Sunflower Chewing Gum conditioned at 13° C. (top trace) and conditioned after a heat/hold step at 45° C. (bottom trace).

TABLE 7

Determination of beta prime fat polymorph in chewing gum using XRD

| Sample Chewing Gum | Conditioned at 13° C. | Conditioned at 13° C. after a heat/hold step at 45° C. | Conditioned 13° C. and then held at room temperature for ~1 year |
|---|---|---|---|
| Soybean | 58% beta prime (25° C.) | 66% beta prime | |
| Sunflower | 50% beta prime (25° C.) | 61% beta prime | |
| Cottonseed | 59% beta prime (13° C.) | 56% beta prime | |
| Palm gum | 58% beta prime (25° C.) | 62% beta prime | |
| Control gum (soybean, cottonseed, wax) | — | — | 69% beta prime |

Table 7 contains the results on the determination of beta prime fat polymorph in chewing gum using XRD. No differences were observed in the beta prime fat polymorph to alpha fat polymorph ratio of Cottonseed chewing gum samples conditioned at 13° C. compared to samples conditioned at 13° C. after a heat/hold step at 45° C. The Soybean and Sunflower chewing gum samples exhibited a significant change in ratio of beta prime fat polymorph to alpha fat polymorph between samples conditioned at 13° C. and those conditioned at 13° C. after a heat/hold step at 45° C. There was an overall increase in beta prime fat polymorph in the Soybean and Sunflower chewing gum samples conditioned after a heat/hold step at 45° C.

Figure 7:
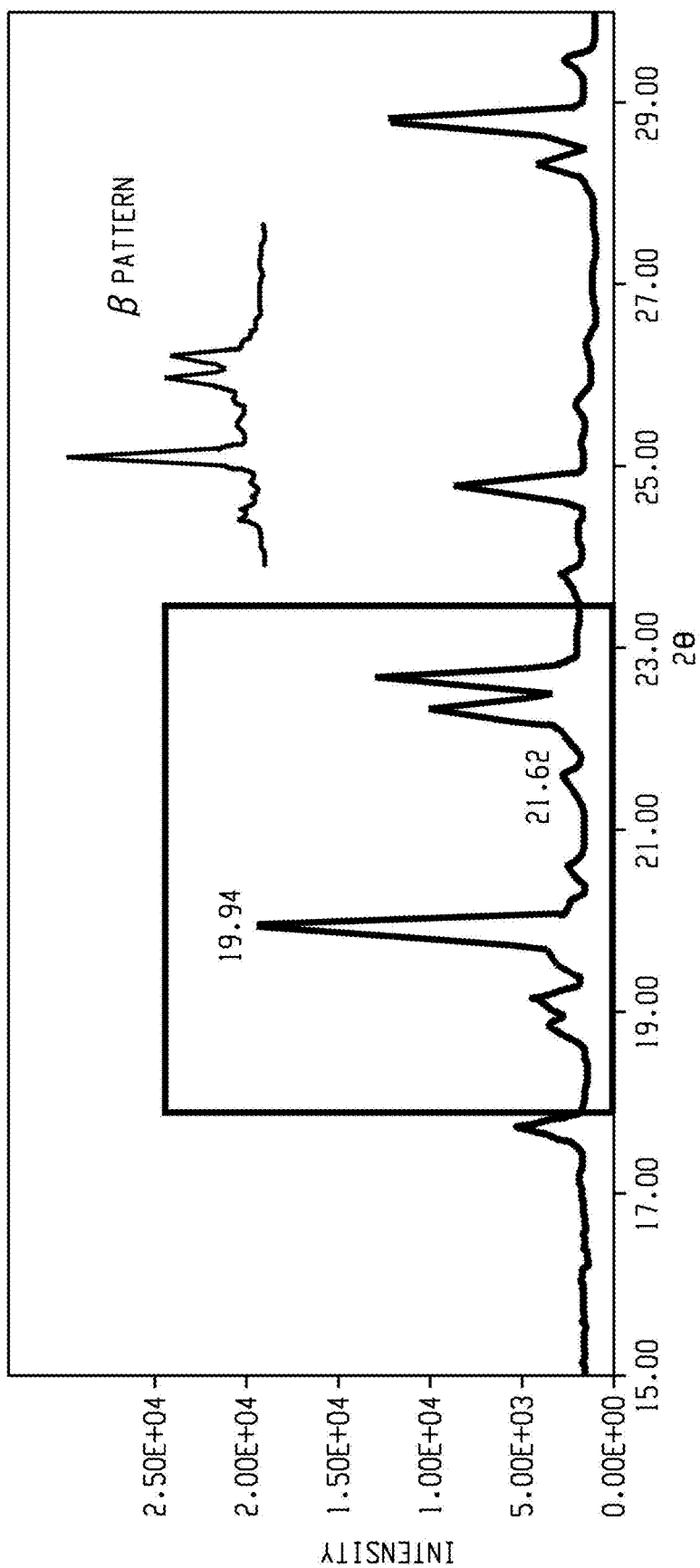
FIG. 7 shows an XRD trace of sunflower fat chewing gum conditioned after a heat/hold step at 50° C. for 30 min (insert shows a trace for the beta pattern).

Samples of pellet chewing gums containing 37% gum base comprising sunflower oil fat, 40-50% sugar alcohol, and 3% flavor were held at 50° C. for 30 minutes and then cooled down slowly clearly show the very distinct pattern characteristic of the beta polymorph in its XRD trace (FIG. 7). The distinct alpha/beta' shoulder peaks do not appear in the XRD trace of this sample gum. What is observed is the characteristic beta pattern, which reveals that the slower cooling allowed for the most stable beta polymorph to form. There is no detectable alpha polymorph in this gum. Studies on sunflower fat via DSC of the fat, fat/wax, and fat/flavor mixtures have shown that heating/holding eliminates the presence of the alpha polymorph.

As used herein the terms "comprising" (also "comprises," etc.), "having," and "including" is inclusive (open-ended) and does not exclude additional, unrecited elements or method steps. The singular forms "a," "an," and "the" include plural referents unless the context clearly dictates otherwise. The endpoints of all ranges directed to the same characteristic or component are independently combinable, and inclusive of the recited endpoint. The term "a combination thereof" is inclusive two or more components of the list. The term "homogeneous" refers to a uniform blend of the components. The terms "first," "second," and the like, "primary," "secondary," and the like, as used herein do not denote any order, quantity, or importance, but rather are used to distinguish one element from another.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of preparing chewing gum, comprising
mixing chewing gum ingredients to prepare a chewing gum mass comprising a gum base,
a bulk sweetener, and about 2 to about 15 wt % of a fat based on the total weight of the chewing gum composition, wherein at completion of mixing, the fat in the chewing gum mass has a ratio of beta prime fat polymorph and/or beta fat polymorph to alpha fat polymorph that is predominantly alpha fat polymorph, and wherein the gum base comprises about 3 to about 25 wt % wax based on the total weight of the gum base;
heating the chewing gum mass to an elevated temperature of about 35 to about 60° C.;
maintaining the chewing gum mass at the elevated temperature for about 30 minutes to about 6 hours, wherein the heating and maintaining do not comprise mixing; and
cooling and conditioning the chewing gum mass to result in a conditioned chewing gum mass wherein the fat has a ratio of beta prime fat polymorph and/or beta fat polymorph to alpha fat polymorph that is predominantly beta prime fat polymorph and/or beta fat polymorph,
wherein the fat comprises about 50 to about 100% beta prime fat polymorph and/or beta fat polymorph;
wherein the ratio beta prima fat polymorph and/or beta fat polymorph to alpha fat polymorph is achieved at completion of conditioning the chewing gum and before packaging, wrapping or coating the chewing gum composition and
wherein the total time for the heating, cooling, and conditioning steps is less than 12 hours.

2. The method of claim 1, wherein the fat in the conditioned chewing gum comprises about 55 to about 95% beta prime fat polymorph and/or beta fat polymorph and the remainder alpha fat polymorph.

3. The method of claim 1, wherein the conditioned chewing gum composition has a Young's modulus of at least 120 kPa or a Durometer Shore A hardness of at least 45 duros measured at completion of conditioning the chewing gum and before packaging, wrapping, or coating the chewing gum composition.

4. The method of claim 1, wherein the heating, cooling, and/or conditioning is conducted at a relative humidity of about 7% to about 45%.

5. The method of claim 1, wherein the fat is a triglyceride comprising greater than or equal to 50% C18 saturated fatty acid and less than 50% C16 saturated fatty acid.

6. The method of claim 1, wherein the fat comprises greater than or equal to 25% tristearin ad less than or equal to 40% tripalmitin.

7. The method of claim 1, wherein the fat is hydrogenated vegetable oil, hydrogenated cottonseed oil, hydrogenated palm kernel oil, hydrogenated soybean oil, hydrogenated sunflower seed oil, hydrogenated peanut oil, hydrogenated coconut oil, hydrogenated sesame oil, or a combination thereof.

8. The method of claim 1, wherein the fat is present in the chewing gum composition at about 3 to about 14 wt % based on the total weight of the chewing gum composition.

9. The method of claim 1, wherein the wax is microcrystalline wax, paraffin wax, petroleum wax, polyethylene was, beeswax, vegetable wax, rice bran wax, candelilla wax, carnuba wax or a combination thereof.

10. The method of claim 1, wherein the gum base comprises an elastomer, the fat, wax, and optionally an additional gum base ingredient comprising an emulsifier, a filler, an antioxidant, or a combination thereof.

11. The method of claim 1, wherein the bulk sweetener is sorbitol.

12. The method of claim 1, wherein the conditioned chewing gum mass is a sheet of chewing gum and the method further comprises forming smaller pieces of chewing gum from the sheet; and packaging or coating the chewing gum pieces.

13. A method of preparing chewing gum, comprising mixing chewing gum ingredients to prepare a chewing gum composition comprising a gum base, a bulk sweetener, and about 2 to about 15 wt % of a fat based on the total weight of the chewing gum composition, wherein at completion of mixing, the fat present in the prepared composition has a ratio of beta prime fat polymorph and/or beta fat polymorph to alpha fat polymorph that is predominantly alpha fat polymorph;

heating the chewing gum composition to an elevated temperature of about 50 to about 60° C.;

maintaining the chewing gum composition at the elevated temperature for about 30 minutes to about 6 hours;

wherein the heating and maintaining do not comprise mixing and are conducted prior to a milling step, a rolling and scoring step, or a step of forming discrete units of the chewing gum composition; and cooling the chewing gum composition to form a treated chewing gum composition where the fat comprises about 50 to about 100% beta prime fat polymorph and/or beta fat polymorph, and the fat has a ratio of beta prime fat polymorph and/or beta fat polymorph to alpha fat polymorph that is predominantly beta prime fat polymorph and/or beta fat polymorph at completion of the heating and maintaining steps and before packaging, wrapping, or coating the treated chewing gum composition, wherein the total time for the heating, cooling, and conditioning steps is less than 12 hours.

14. The method of claim 1, wherein the maintaining the chewing gum mass at the elevated temperature is for about 45 minutes to about 3 hours.

15. The method of claim 1, wherein the maintaining the chewing gum mass at the elevated temperature is for about 1 hour to about 2 hours.

16. The method of claim 13, wherein the maintaining the chewing gum composition at the elevated temperature is for about 45 minutes to about 3 hours.

17. The method of claim 13, wherein the maintaining the chewing gum composition at the elevated temperature is for about 1 hour to about 2 hours.

* * * * *